(12) United States Patent
Zhu et al.

(10) Patent No.: US 7,415,400 B2
(45) Date of Patent: Aug. 19, 2008

(54) SYSTEM, METHOD, AND DEVICE FOR DESIGNING A DIE TO STAMP METAL PARTS TO AN EXACT FINAL DIMENSION

(75) Inventors: Xin Hai Zhu, Pleasanton, CA (US); Bradley N Maker, Danville, CA (US)

(73) Assignee: Livermore Software Technology Corporation, Livermore, CA (US)

( * ) Notice: Subject to any disclaimer, the term of this patent is extended or adjusted under 35 U.S.C. 154(b) by 666 days.

(21) Appl. No.: 10/271,931

(22) Filed: Oct. 15, 2002

(65) Prior Publication Data

US 2004/0073323 A1    Apr. 15, 2004

(51) Int. Cl.
*G06G 7/48* (2006.01)
(52) U.S. Cl. .................... 703/7; 703/1; 703/2; 700/98
(58) Field of Classification Search .............. 703/1, 703/7, 2; 700/97, 98
See application file for complete search history.

(56) References Cited

U.S. PATENT DOCUMENTS

| 5,379,227 | A |   | 1/1995  | Tang et al. |
| 5,609,342 | A |   | 3/1997  | Peterson et al. |
| 6,035,242 | A | * | 3/2000  | Uemura et al. ............... 700/97 |
| 6,256,547 | B1 |  | 7/2001  | Tognon |
| 6,295,464 | B1 |  | 9/2001  | Metaxas |
| 6,301,763 | B1 |  | 10/2001 | Pryor |
| 6,338,000 | B1 |  | 1/2002  | Nakajima et al. |
| 6,353,768 | B1 |  | 3/2002  | Karafillis et al. |
| 6,415,191 | B1 |  | 7/2002  | Pryor |
| 6,478,991 | B1 |  | 11/2002 | Mancosu et al. |
| 6,560,570 | B1 |  | 5/2003  | Dohrmann et al. |
| 6,678,642 | B1 |  | 1/2004  | Budge |
| 6,785,640 | B1 | * | 8/2004  | Lu et al. ..................... 703/7 |
| 6,922,903 | B2 |  | 8/2005  | Horn |
| 7,167,816 | B1 |  | 1/2007  | Olovsson |
| 7,194,388 | B2 | * | 3/2007  | Chu et al. .................... 703/2 |
| 2002/0077795 | A1 |  | 6/2002  | Woods et al. |
| 2002/0177983 | A1 |  | 11/2002 | Maker |
| 2006/0201229 | A1 |  | 9/2006  | Zhu et al. |

OTHER PUBLICATIONS

Livermore Software Technology Corporation; "LS-DYNA Keyword User's Manual"; Mar. 2001; LSTC; Version 960; Title, Contents, 18.6-18.10.*
M. Feliziani and F. Maradei; "An Explicit-Implicit Solution Scheme to Analyze Fast Transients by Finite Elements"; Mar. 1997; IEEE Transactions on Magnetics; vol. 33, No. 2; pp. 1452-1455.*
Myer Kutz, ed.; Mechanical Engineers' Handbook; 1998; John Wiley & Sons, Inc.; Second Edition; pp. 311-313.*

(Continued)

*Primary Examiner*—Paul L Rodriguez
*Assistant Examiner*—Jason Proctor
(74) *Attorney, Agent, or Firm*—Weaver Austin Villeneuve Sampson LLP

(57) ABSTRACT

A system and method for designing stamping tools that produce parts of desired dimensions. The system and method compensate for post stamping deviations from the desired dimensions in the shape of the tools used to produce the parts. The compensated tools result in nearly ideal parts.

9 Claims, 25 Drawing Sheets

The new iterative compensation procedure

OTHER PUBLICATIONS

USPTO/Office Action issued in U.S. Appl. No. 09/836,490 mailed Sep. 13, 2004, received Sep. 20, 2004, 15 pages.

LS-DYNA Keyword Users Manual, May 1999, Livermore Software Technology Corporation, Version 950, pp. 1.1-12; 7.28-29; 18.6-9.

ABAQUS/Answers, Spring 1997, Hibbitt, Karlsson & Sorenson, Inc., pp. 1-4.

ABAQUS/Answers, Summer 1999, Hibbitt, Karlsson & Sorenson, Inc., pp. 1-4.

Wang, Choudhry and Wertheimer, "Comparison Between the Static Implicit and Dynamic Explicit Methods for FEM Simulation of Sheet Forming Processes," 1997, pp. 1-6.

T. J. R. Hughes, *The Finite Element Method: Linear Static and Dynamic Finite Analysis*; Dover Publications, Prentice-Hall, 1987, 2000, pp. iii-682.

"LS-DYNA Keyword User's Manual, Nonlinear Dynamic Analysis of Structures", Livermore Software Technology Corporation, Version 950, May 1999, 20 pages.

Plimpton et al., "Transient Dynamic Simulations: Parallel Algorithms for Contact Detection and Smoothed Particle Hydrodynamics", IEEE, 1996, 21 pages.

LS_DYNA News, "An Information Letter for Users and Applications of LS-SYNA edited by the European LS-DYNA Distributor Group", Issue 3, Jan. 1999, 12 pages.

Stoker, "Development of the Arbitrary Langrangian-Eulerian Method in Non-Linear Solid Mechanics. Application to Forming Processes", University of Twente, Feb. 1999, 1 page.

Antaki et al., "A Parallel Dynamic-Mesh Lagrangian Method for Simulation of Flows With Dynamic Interfaces", IEEE, 2000, 11 pages.

FEA Information Co., 3rd Issue, Dec. 9, 2000, 13 pages.

Benamou, "An Eulerian Numerical Method for Geometric Optics", Canum, 2000, 28 pages.

Guilkey et al., "An Implicit Time Integration Strategy for Use with the Material Point Method", Elsevier Science Ltd. 2001, 4 pages.

"LS-DYNA Keyword User's Manual, vol. 1", Livermore Software Technology Corporation, Version 960, May 2001, 17 pages.

FEA Information International News, Issue Mar. 2001, 11 pages.

Maker, "Implicit Springback Calculation Using LS-DYNA," Livermore Software Calculation Using LSDYNA, 5th International LS-DYNA Users Conference, Sep. 21-22, 1998, 1 page.

USPTO Office Action mailed in U.S. Appl. No. 10/081,387 on Aug. 24, 2005, 14 pages.

USPTO, Office Action mailed in related U.S. Appl. No. 11/420,444 on May 30, 2007, 10 pages.

USPTO, Office Action mailed in related U.S. Appl. No. 09/836,490 on May 3, 2005, 19 pages.

USPTO, Office Action mailed in related U.S. Appl. No. 09/836,490 on Mar. 7, 2006, 10 pages.

USPTO, Office Action mailed in related U.S. Appl. No. 09/836,490 on Oct. 18, 2006, 9 pages.

USPTO, Notice of Allowanced mailed in related U.S. Appl. No. 09/836,490 on Jun. 18, 2007, 8 pages.

USPTO, Notice of Allowance mailed in related U.S. Appl. No. 10/081,387 on Feb. 22, 2006, 7 pages.

USPTO, Notice of Allowance mailed in related U.S. Appl. No. 10/081,387 on Sep. 6, 2006, 5 pages.

Beijer et al., "Time Integration Strategies for FEM Analysis with Nonlinear Viscoelastic Polymers", 2000, Computational Techniques for Materials, Composite Structures, 12 pages.

Curiel Sosa, J.L., et al., "A Combined Implicit-Explicit Algorithm in Time for Non-Linear Finite Element Analysis", John Wiley & Sons, Ltd., 20905, pp. 63-75.

* cited by examiner

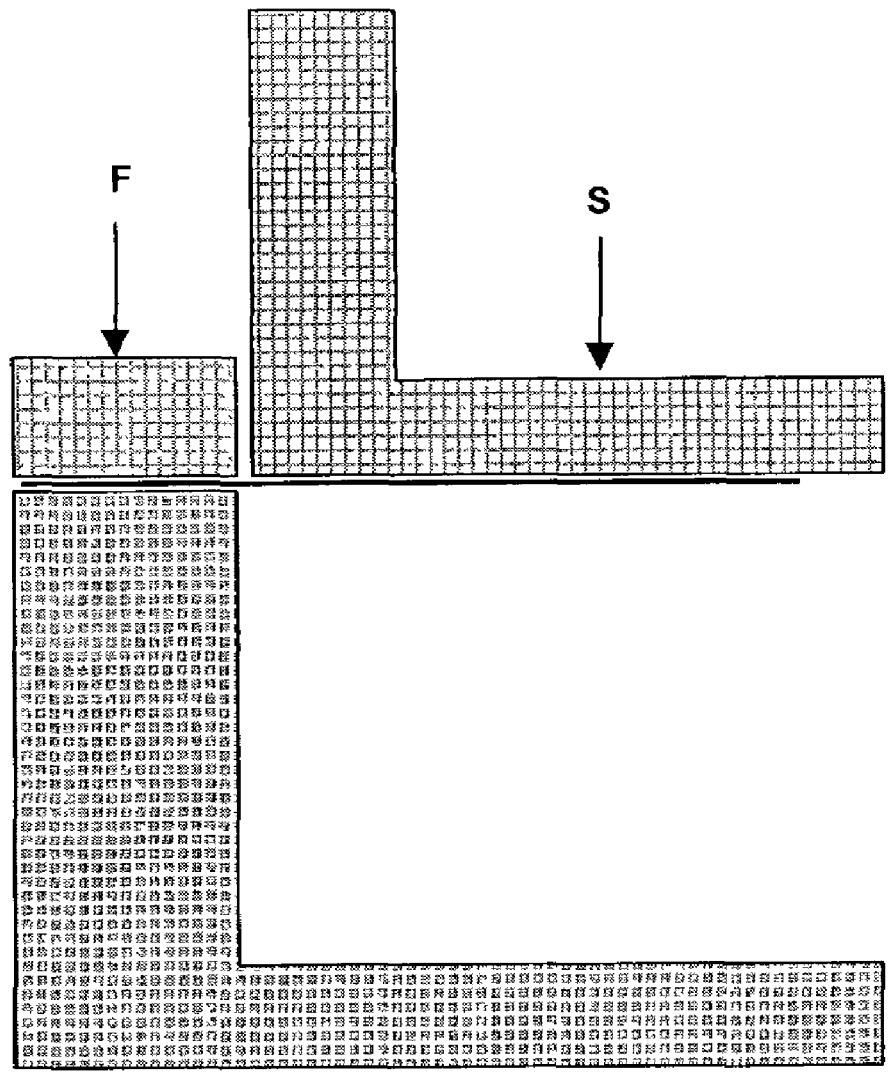
FIG. 2A -
BEFORE
STAMPING

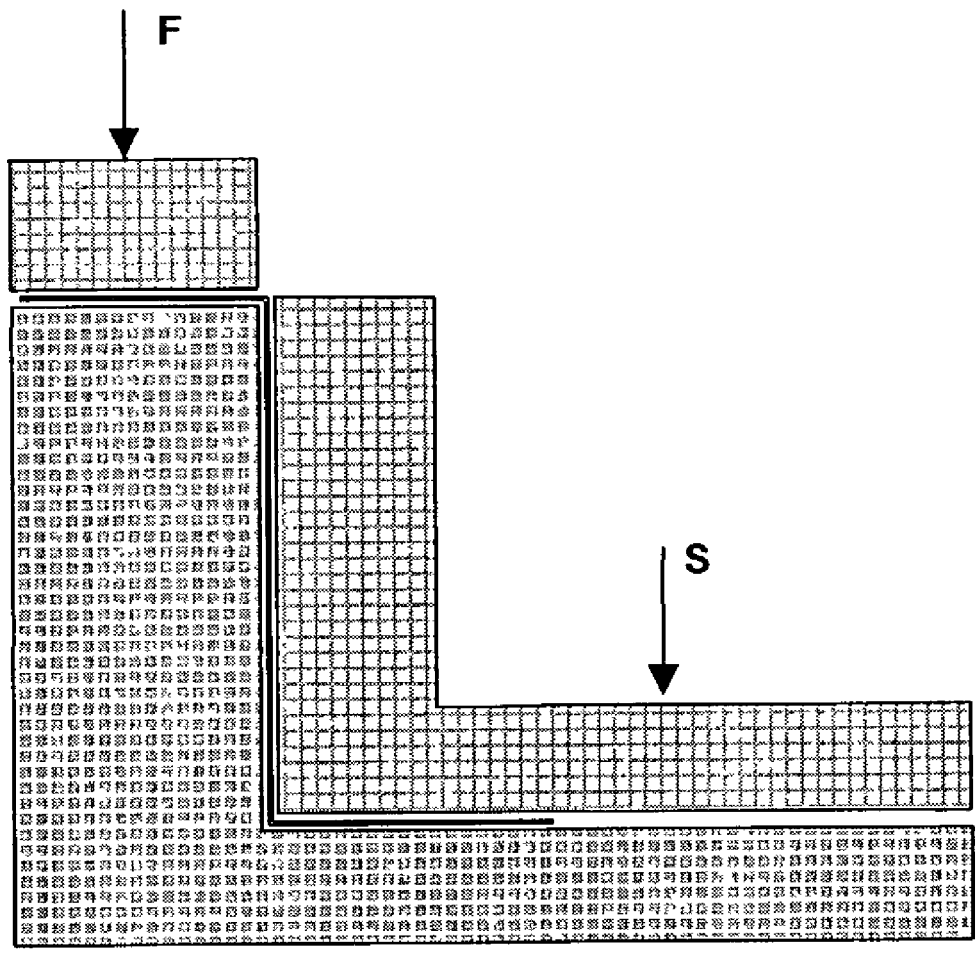
FIG. 2B -
AFTER
STAMPING

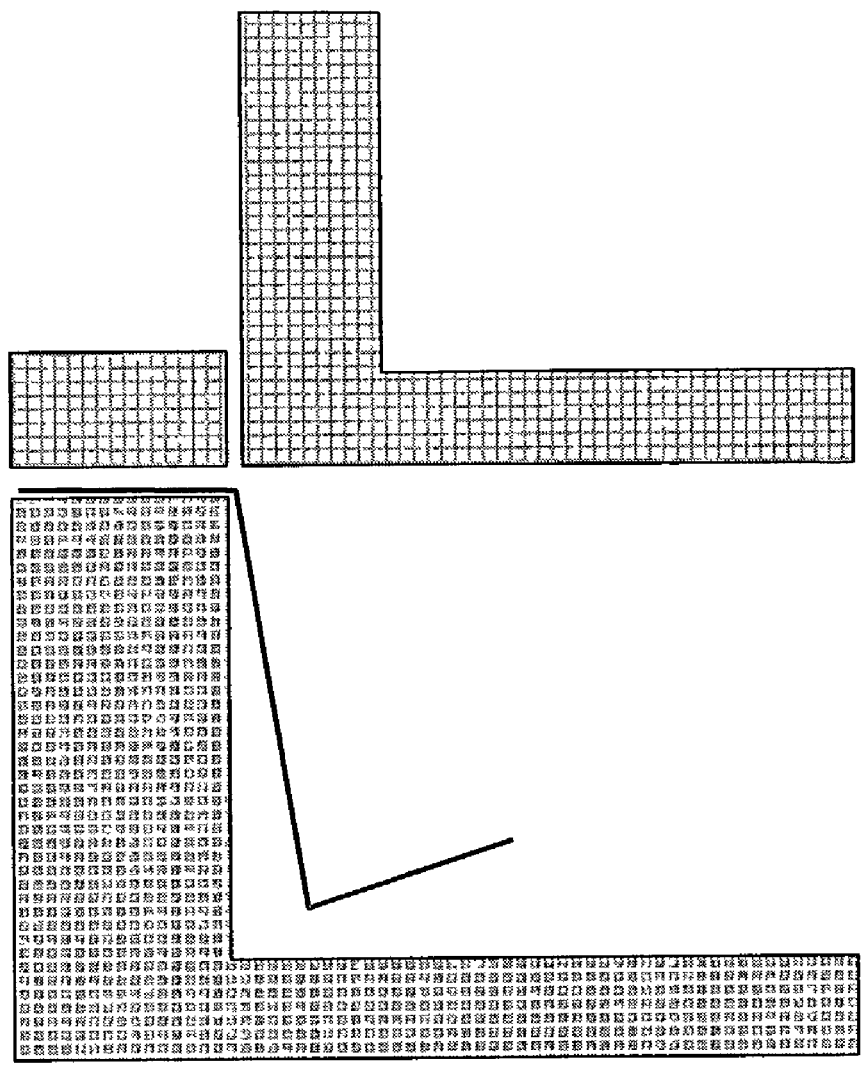
FIG. 2C - AFTER SPRINGBACK

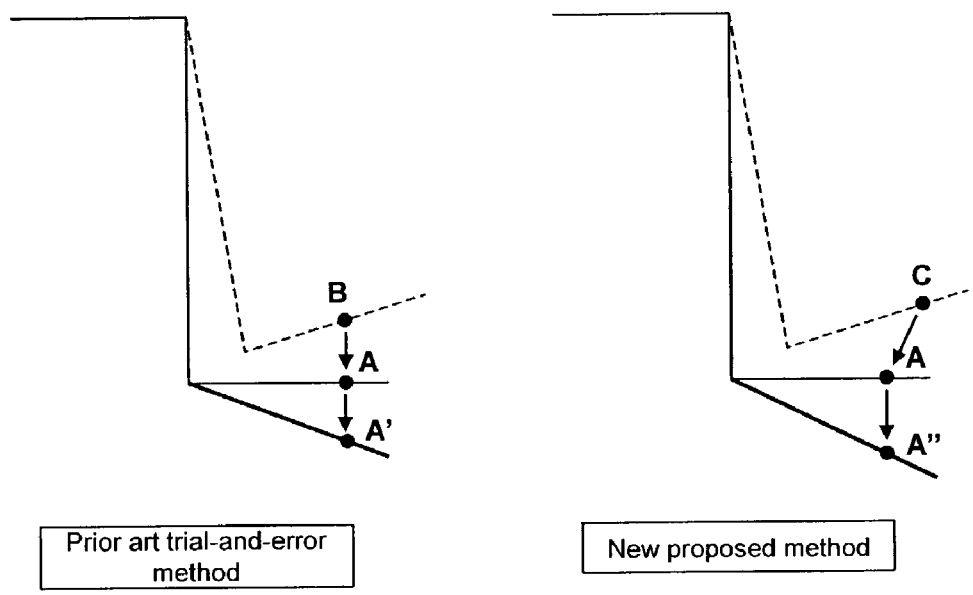
FIG. 4 - Compensated Tool Geometry

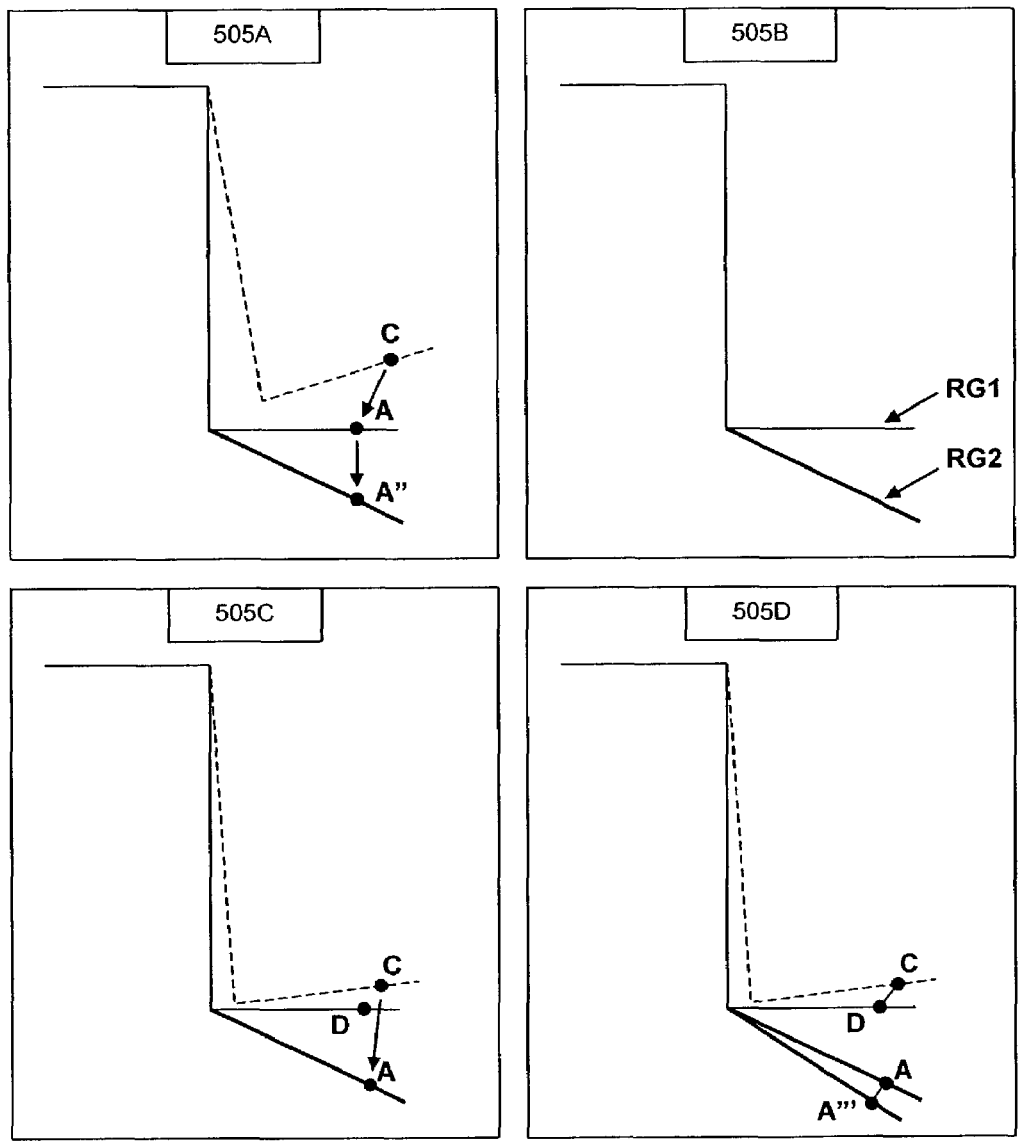
FIG. 5 - The new iterative compensation procedure

The FE meshes and point locations presented in the flow charts of figures 7-9.

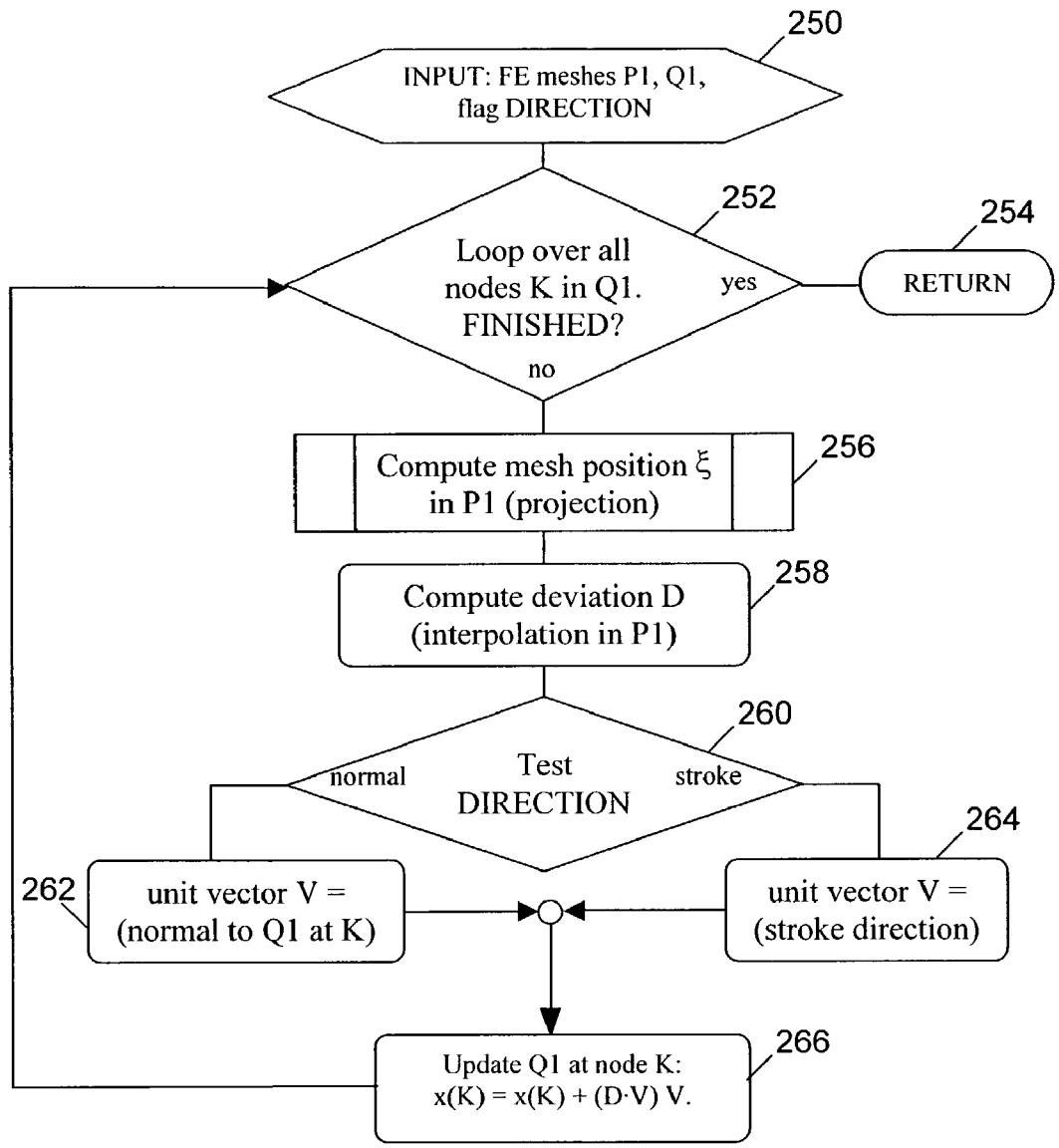
FIG 9 - Reference geometry and tool updates

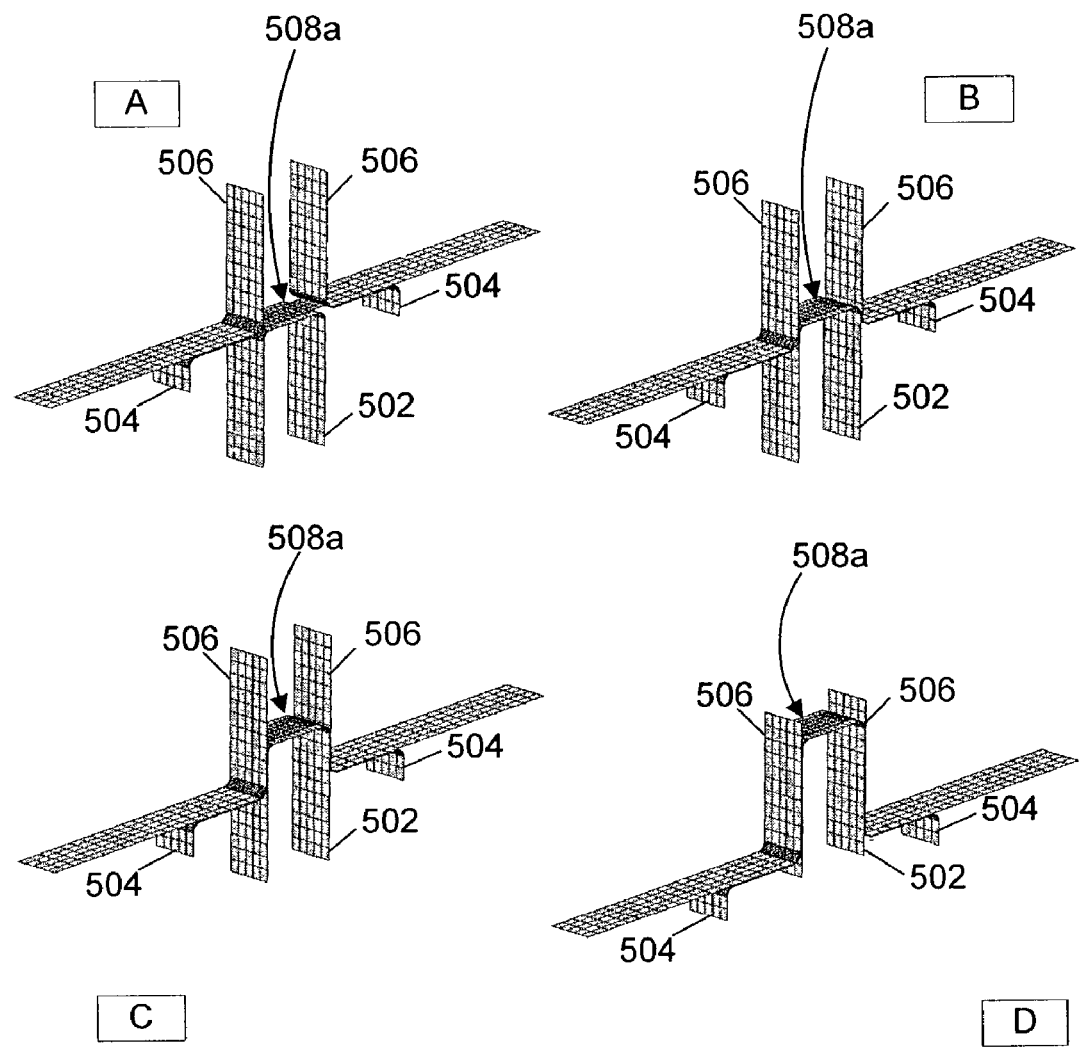
FIG. 10 - An FE model of the NUMISHEET '93 U-Channel benchmark problem, shown at various stages during the stamping simulation

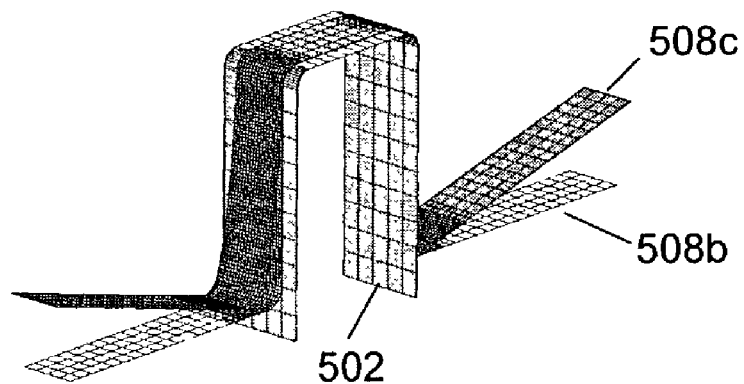
FIG. 11 - The U-Channel part is shown after stamping and springback using the original uncompensated tools

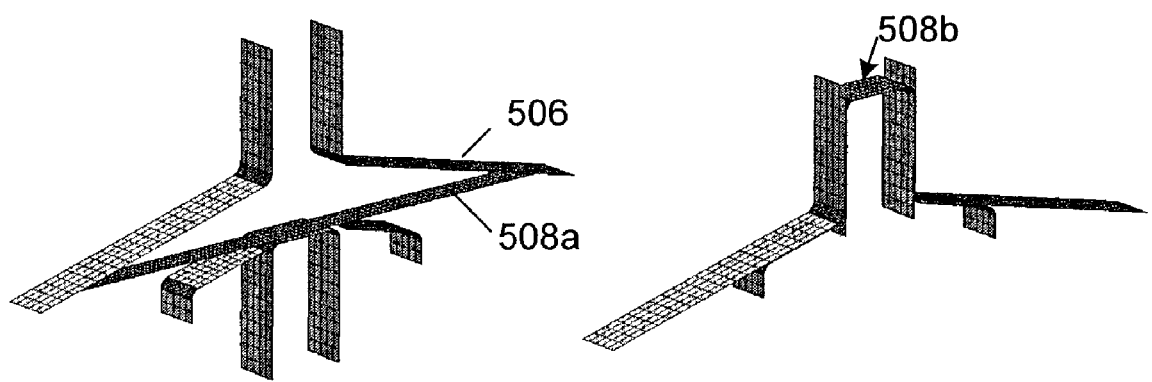
Figure 12 - FE models of the compensated tools.

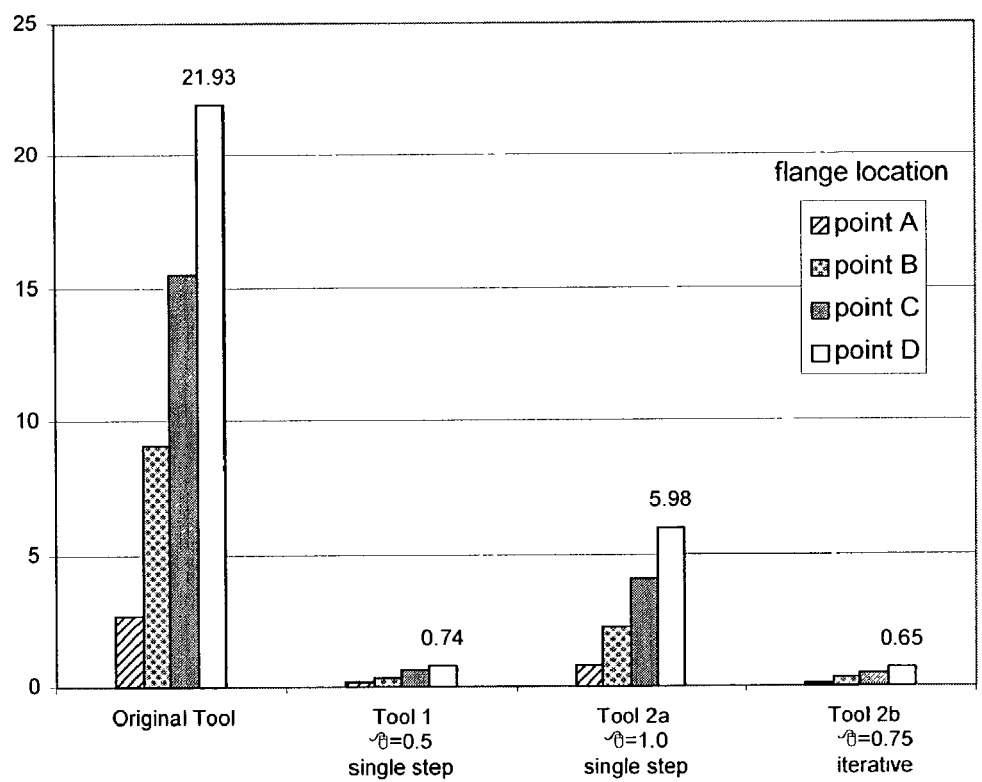
FIG. 14 - Deviations from the desired part shape, in millimeters.

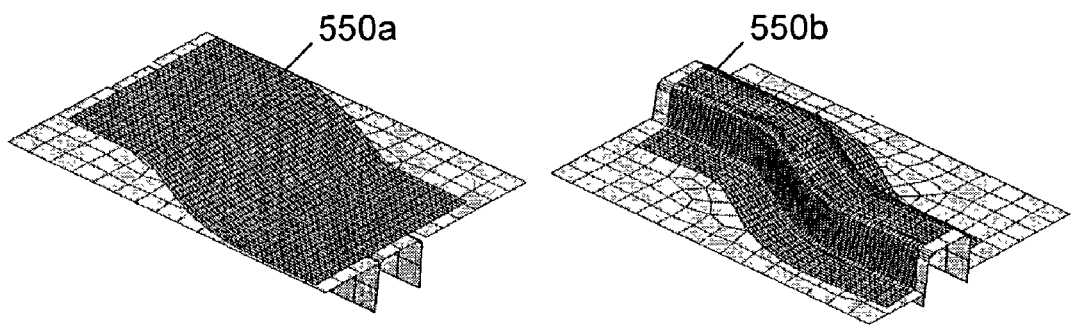
FIG. 15 - FE mesh for the NUMISHEET '96 S-rail part

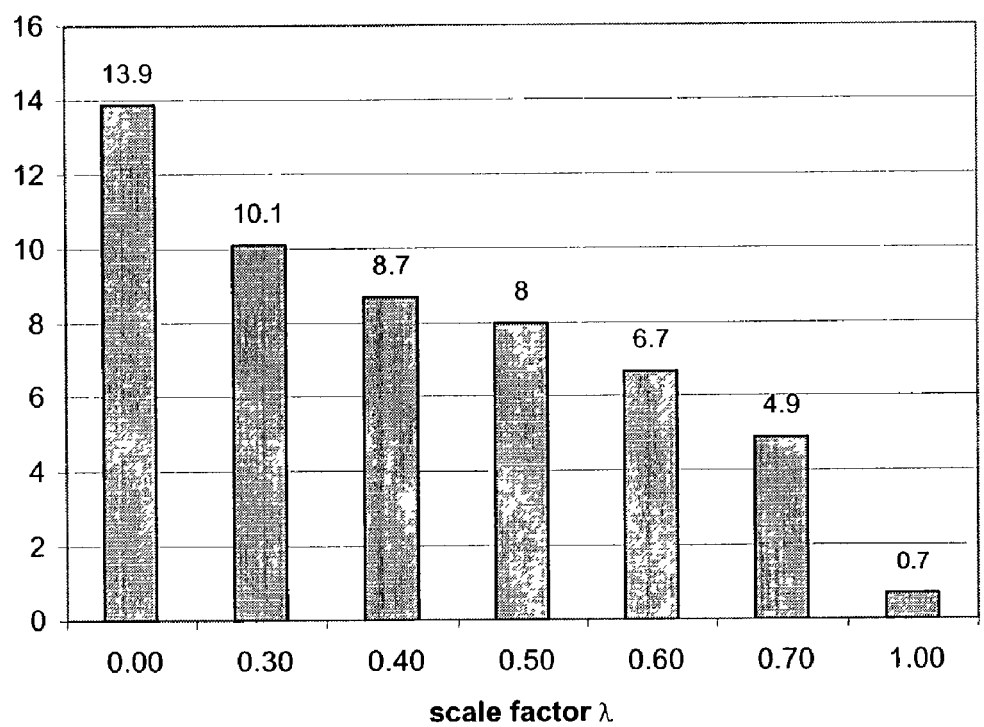
FIG. 16 - Deviations in flange angle from the desired part shape, in degrees

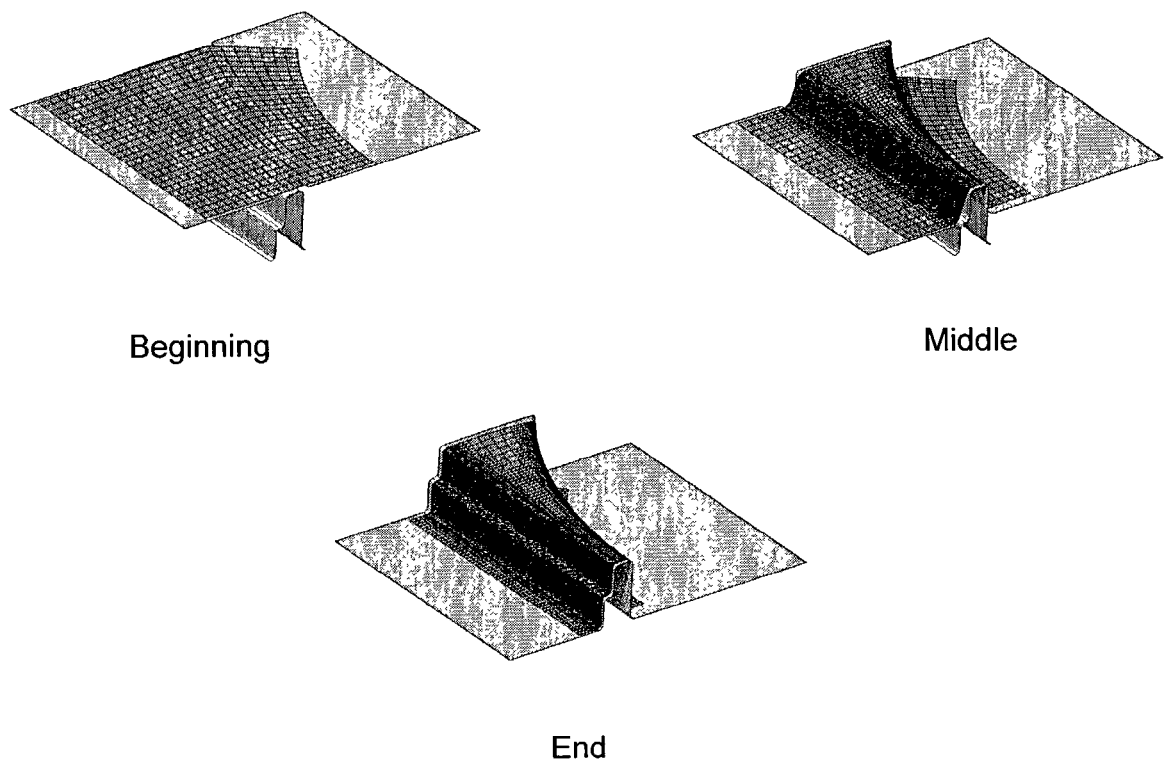
FIG. 17 - The FE model for the Budd Channel example

Ideal    After Springback

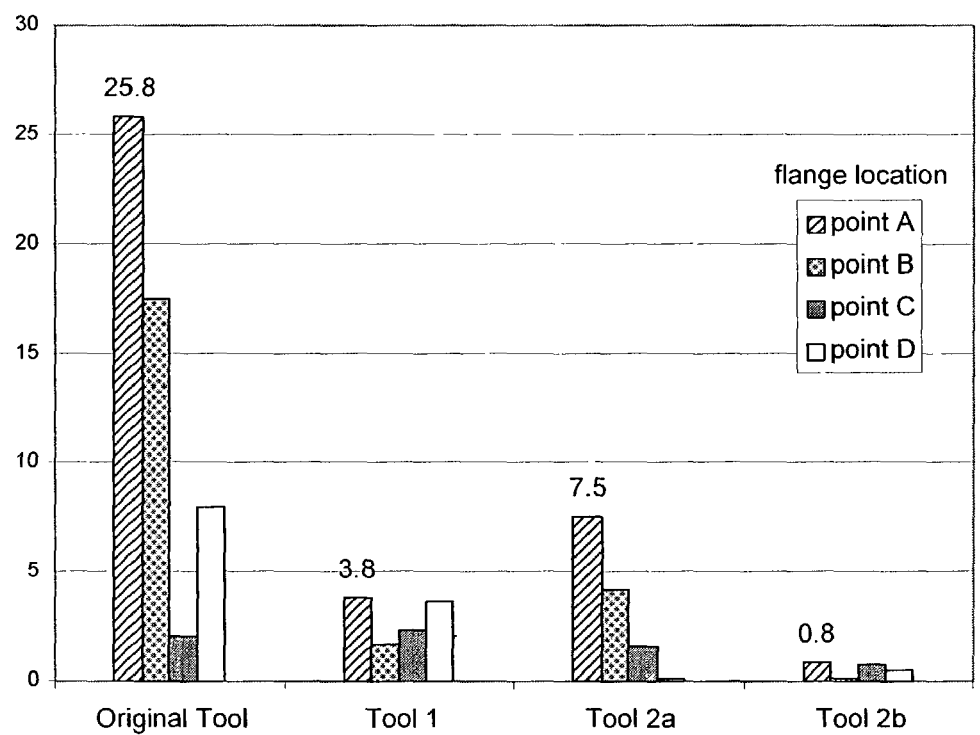
FIG. 20 - Deviations from the desired part shape, in millimeters

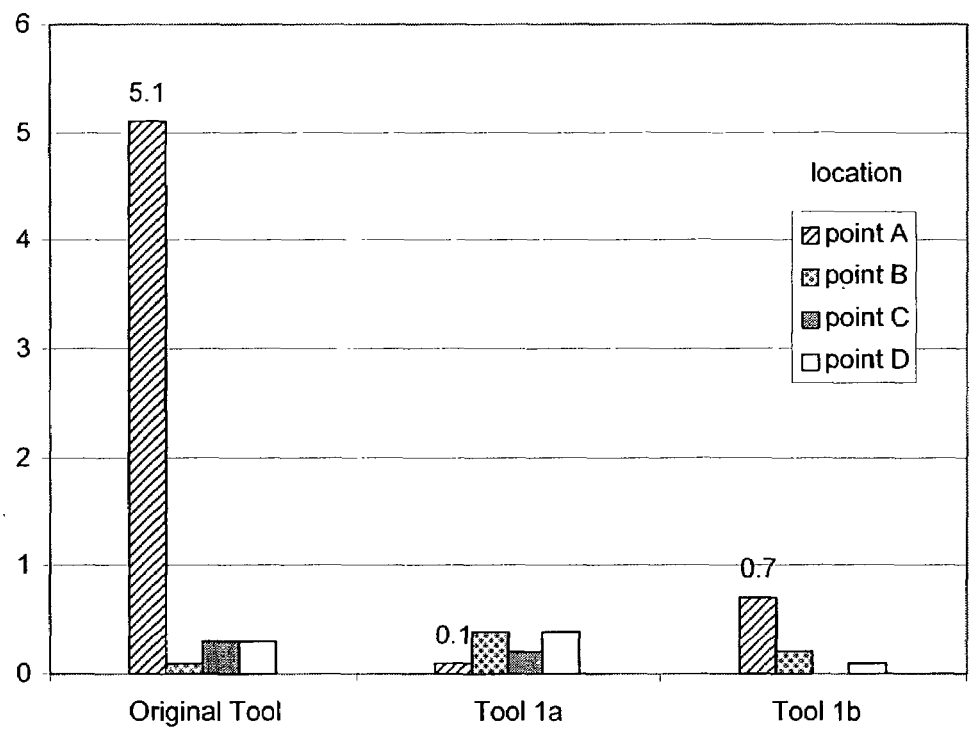
Figure 22 - Deviations from the desired part shape, in millimeters, are shown at four points on the hood inner part.

SYSTEM, METHOD, AND DEVICE FOR DESIGNING A DIE TO STAMP METAL PARTS TO AN EXACT FINAL DIMENSION

CROSS REFERENCE TO RELATED APPLICATIONS

This application is related to U.S. patent application Ser. No. 09/836,490 filed Apr. 17, 2001 entitled "Implicit-Explicit Switching for Finite Element Analysis", and U.S. patent application Ser. No. 10/081,387, filed Feb. 22, 2002 entitled "Eularian Lagrangian Mapping for Finite Element Analyses," which are hereby incorporated by reference in their entirety.

BACKGROUND

1. Field of the Invention

The present invention relates generally to the field of computer simulation and prediction and more specifically to using a computer system and method for compensating dies used in stamping metal parts.

2. Related Art

A major factor in the success of a car company (or any company) is the ability to quickly roll out new models. The lead time required to develop a new car, from the initial designs to production line readiness, has over the years been reduced to approximately three years from well over five years in the recent past. In such a large scale development, there are many parts and processes that must be developed simultaneously in order for a car to be ready for production.

The design and perfection of the tools used for stamping of the metal parts, i.e. the body and chassis of a vehicle, remain the single longest lead time tasks of the entire development process. It requires approximately one year to develop and refine the dies for stamping of the body and chassis. This is largely because making a die that will create parts having the exact dimensions desired is a trial and error process requiring years of experience and craftsmanship. This is especially true with the use of lighter and more elastic materials that are gaining popularity in the quest for more fuel efficient and cleaner burning vehicles. The stamping of aluminum and other high tensile steel increasingly used in the production of vehicles is even more complicated than in the past.

Metal parts stamped in a die are subject to a phenomena known as springback. Springback is an elastic deformation which occurs at the end of a sheet metal stamping process, as the stamped part is removed from the stamping tools. Springback has the effect of changing the part's finished shape so that it no longer matches the shape of the tools. If this shape deviation is large, it can cause difficulty during a subsequent assembly process, or cause twisting in the assembled part. Accordingly, it is important to produce parts whose finished shape closely matches the designed surface. Usually corrections to compensate for springback are made by modifying the shape of the stamping tools (dies).

The design of these modifications, or die compensation, is a complex process. Two commonly used methods are the trial-and-error and spring-forward methods. The trial-and-error method predicts die modifications based on engineering experience. Usually many years of die-shop experience are necessary before an engineer can successfully guess how to change the dies. The trial-and-error method is also very time consuming: fabrication of a modified die set usually takes months of time. In addition, several trial-and-error corrections are frequently required before adequately compensated parts are obtained. Accordingly, the trial-and-error process is very expensive, often requiring over one million dollars to make a die which produces "good" parts. When new materials are used or when a new design is adopted, previous experience cannot be applied directly. These problems with the trial-and-error method can result in costs and lead-times which are out of control.

However, there are several major limitations to this process. First, the die has very limited access once it has been set up to stamp parts. It is quite cumbersome to separate a tool and die once it has been assembled to modify the die. Second, the dies are very complex, and altering one area of the die, or one bend, will affect another area, or a subsequent bend. The situation arises wherein a series of bends or other deformations each have springback errors compounding one after the other. In such complex parts, even the most skilled artisan has difficulty accommodating for springback. Third, even if the trial and error method could yield the perfect die shape to produce precisely dimensioned parts with the desired shape, the time and effort required to modify the die is tremendous and lengthens the overall development time of the vehicle. There is therefore a need for a predictive process and tool to create a die that will produce a part having exactly the desired dimensions in a shorter period of time, thus reducing the start to finish development time of new vehicles or other products.

Computer simulation has gained popularity in the stamping industry due to its speed and low cost, and it has been proven to be effective in prediction of formability and springback behaviors. However, to date no effective simulation method has been found to compensate the die based on the springback prediction.

The finite element method is a technique for obtaining approximate numerical solutions to boundary value problems which predict the response of physical systems subjected to external loads. The finite element method is described in detail by Thomas J. R. Hughes in "The Finite Element Method" (1987), published by Prentice-Hall, Inc., New Jersey, which is incorporated herein by this reference in its entirety. One common use of the finite element method is in the field of solid mechanics where it is used to analyze structural problems such as the formation of stamped sheet metal parts or the springback of stamped sheet metal parts. The equations describing the physical event of interest are generally overly complex to be solved exactly.

The finite element method is a technique where the geometry of the analyzed structure is approximated as a set of points in space. The points, which are referred to as nodes, are connected together to form finite elements.

The finite element method can be used to run two or three dimensional simulations. In a two-dimensional (2D) simulation the elements are areas. In a three-dimensional (3D) simulation the elements are volumes. All of the simulations illustrated in this example are 3D simulations. The elements are therefore three dimensional volumes. However, for ease of illustration and explanation cross sections are used to illustrate the invention. The elements and nodes form a mesh or grid, and these terms are used interchangeably throughout this application. Additionally, the elements are shown as cubes or rectangles, however other geometric shapes may be used.

In structural mechanics, the matrix equations describe the relationship between the stress and velocity fields and the acceleration field at a specific instant in time. To follow the deformation process, one needs to integrate the matrix equations in time. Due to non-linearities, an exact integration is generally not possible. A time discretization is necessary and one usually relies on a finite difference scheme to drive the solution forward in time. The matrix equations may be explicitly or implicitly integrated.

A well known simulation-based die compensation procedure is the spring-forward method. This method begins by performing a stamping simulation by finite element analysis ("FEA"), which provides information for the stamped part while it is still positioned in the closed dies. This information includes the geometry and material stress and strain data. The method then assumes that subsequent springback deformation will be driven by material stress, and that if the stress distribution through the material thickness is (artificially) reversed, the resulting springback deformation will also be in the reversed direction, as compared to the actual part. Based on this logic, the geometry which is obtained by springback analysis with reversed stress can be used to predict modifications to the dies. This method is very simple to apply, and it is the most popular numerical method. However, the method suffers from two major shortcomings which prohibit use in many practical applications.

The first major shortcoming of the spring-forward method is the so-called under-cut problem, where predicted die modifications lead to tools which are impossible to operate, as can be seen in FIG. 1B. Undercutting occurs when a tool wall or face in the compensated die geometry has a negative angle in relation to the stroke direction (the line of action in which the tools move during the punch and die closing process.) This creates interference between the punch and die as the tools close. Undercutting problems occur when compensating parts that have steep walls.

The second shortcoming of the spring-forward method is an issue of accuracy. Since the method can be applied only once, an unsatisfactory prediction of compensated geometry means that the method fails.

An additional difficulty in simulation-based springback compensation procedures used to date arises from the complexity of the die surfaces. Engineers typically make modifications to the original tool surface data using CAD software, then generate the FEA model again using the new CAD surfaces. This procedure is time consuming, and it is typically only applied to certain local areas of the tools. Accordingly, it is very difficult, if not impossible, to make a global modification to the die design based on the numerical predictions.

SUMMARY OF THE INVENTION

The proposed automatic die compensation method is designed to avoid the problems mentioned above while providing effective die compensation. This method is based on the predicted deviation of the part geometry (after springback) from the designed or intended geometry. Deviations are calculated at locations across the entire tool surface, and then the entire tool surface is compensated using these deviation values. The FEA models of the tools are modified directly, so it is not necessary to modify the CAD surface data and then rebuild the FEA model. An iterative method can also be used with this approach, since the method can be re-applied a number of times if the results of a single prediction are not satisfactory.

BRIEF DESCRIPTION OF THE FIGURES

FIG. 2A is a cross section of a tool at the beginning of a stamping operation.

FIG. 2B is a cross section of the tool in FIG. 2A during the stamping operation.

FIG. 2C is a is a cross section of the tool in FIG. 2A illustrating springback of the part after the operation shown in FIG. 2B.

FIG. 4 is a comparative illustration of compensated tool geometry of the prior art trial and error method and the new method of the present invention.

FIG. 5 in an illustration of the iterative compensation steps 505A-D.

FIG. 9 is a flow chart describing reference geometry and tool updates of the iterative die compensation method.

FIG. 10 is a finite element model of the NUMISHEET '93 U-channel benchmark problem.

FIG. 11 illustrates the NUMISHEET '93 U-channel after stamping using the prior art method and tool.

FIG. 12 illustrates the NUMISHEET '93 U-channel compensated tools designed with the present invention before and after stamping.

FIG. 14 is a chart of deviations from the desired part shape in millimeters at four equally spaced points along the flange of the NUMISHEET '93 U-channel.

FIG. 15 is a finite element mesh of the NUMISHEET '96 S-rail part shown before and after stamping.

FIG. 16 is a chart of deviations in flange angle from the desired part shape in degrees for the NUMISHEET '96 S-rail part.

FIG. 17 is a finite element model for a Budd Channel example at the beginning, middle, and end of the stamping operation.

FIG. 20 is a chart of deviations from the desired part shape in millimeters for the Budd Channel part at the locations shown in FIG. 19.

FIG. 22 is a chart of deviations at the four points on the automotive hood shown in FIG. 21.

DETAILED DESCRIPTION OF THE INVENTION

The preferred embodiments of the present invention and their advantages are best understood by referring to FIGS. 1A through 22 of the drawings. Like numerals are used for like and corresponding parts of the various drawings.

System Overview

Figure 1A:
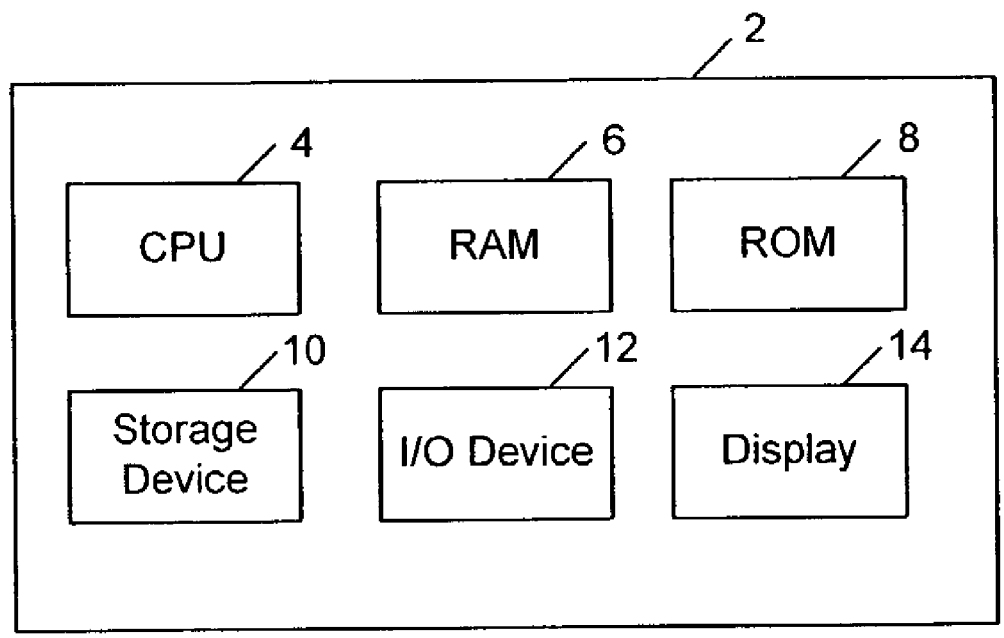
FIG. 1A is a schematic of an exemplary computer system of the present invention.
Figure 1B:
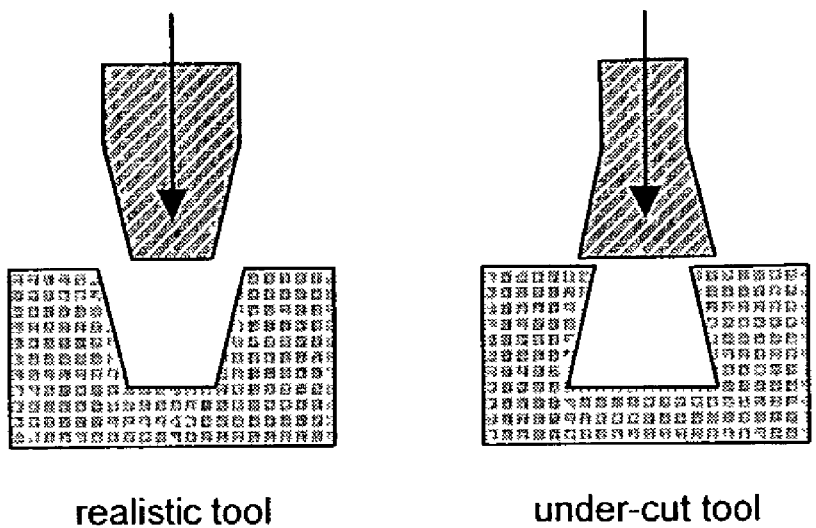
FIG. 1B is a cross section of tools illustrating the under-cut problem.

FIG. 1A is a block diagram of an exemplary computer system 2 upon which the methods of the present invention can be performed, according to an embodiment of the present invention. Computer system 2 can include one or more suitable processing facilities such as microcomputers/workstations, minicomputers, mainframes, and/or massively parallel processing computers running suitable operating systems. Examples of suitable microcomputers/workstations include the IBM PC from IBM Corporation of Armonk, N.Y., and the Sparc-Station from Sun Microsystems Corporation of Mountain View, Calif. Examples of suitable minicomputers are the VAX 750 from Digital Equipment Corporation of Maynard, Mass. and the AS/400 from IBM. An example of a suitable mainframe is the System-390 series from IBM. Examples of suitable massively parallel processing computers include the Cray T3E or the Cray T90 from Cray Corporation of Mendota Heights, Minn. Examples of suitable operating systems include any of the various versions of Unix, VMS from Digital Equipment, now owned by Compaq, or OS/2 from IBM. Computer systems used in the development of the invention include the IBM RS-6000, the Hewlett-Packard V-Class, and the Silicon Graphics Origin 2000, all of which are engineering workstations or servers running under the UNIX operating system, as ported by each hardware vendor. Those skilled in the art will recognize that other types of suitable computer systems and suitable operating systems can be used in accordance with the present invention.

Computer system 2 includes the following components: a central processing unit (CPU) 4, a random access memory (RAM) 6, a read-only memory (ROM) 8, a storage device 10 that reads and writes to storage media, an input/output (I/O) device 12, display 14, and network connection 16. Although only a single instance of each component is shown, it should be recognized that computer system 2 can include one or more of any of the components shown in FIG. 4. Computer system 2 can also include other suitable computer components. For clarity, interconnections between the various components of computer system 2 are not shown. Additionally, multiple computers 2 can be connected via network connection 16, either through a local area network (LAN) or through a larger network such as the internet. A computer "farm" may be configured wherein each computer system 2 or CPU 4 calculates a portion of the simulation. The portions are then later integrated to arrive at the complete simulation. In some cases, this networked "farm" may be more efficient than using one more powerful computer such as a workstation or mainframe.

CPU 4 can be any type of processor, such as a Pentium processor from Intel Corporation or a reduced instruction set ("RISC") processor commonly employed in workstations, used to process information in computer system 2.

RAM 6 can be any type of memory device, including dynamic and/or static RAM, used to store any number of different types of information required by computer system 2. For example, RAM 6 can store computer programs for performing the method of the present invention.

ROM 8 can be any type of read-only memory device, including PROMs, EPROMs and EEPROMs, used to store any number of different types of information required by computer system 2. For example, ROM 8 can store information concerning initialization routines or even some or all of the computer programs for performing the method of the present invention.

Storage device 10 can be any type of mass storage device, including magnetic, electrical, and optical-type storage devices, used to store any number of different types of information required on a variety of storage media, by computer system 2. For example, storage device 10 can store various types of data or even some or all of the computer programs for performing the method of the present invention. The computer programs may be transmitted over network connection 16 as a data signal, or may be distributed on various types of storage media.

I/O device 12 can be any type of input/output device, including keyboards, printers, or any other type of device, by which information can be entered into or received from computer system 2.

Display 14 can be any type of display device, including those of the CRT and flat-panel display type, used to display information. For example, display 14 can display the results of a computer simulation, which results from performing the methods of the present invention, via a graphical user interface.

Single Step Die Compensation Method

The proposed automatic die compensation method is designed to avoid the problems mentioned above while providing effective die compensation. This method is based on the predicted deviation of the part geometry (after springback) from the designed or intended geometry. Deviations are calculated at locations across the entire tool surface, and then the entire tool surface is compensated using these deviation values. The FEA models of the tools are modified directly, so it is not necessary to modify the CAD surface data and then rebuild the FEA model. An iterative method can also be used with this approach, since the method can be re-applied a number of times if the results of a single prediction are not satisfactory.

Computing Springback Deviation

Tool surfaces are compensated using deviations measured at corresponding locations in the finished part. The FIGS. 2A and 2B illustrate how springback deviations on the finished part are projected and/or extrapolated onto the tools. FIG. 2A shows a cross-section view of a typical stamping operation, where a simple set of tools is used to form a flanged part. During the stamping operation, a force "F" is applied to the binder to hold one end of the part, and the upper tool moves vertically downward in stroke direction "S" to meet the lower tool, forming the part between them, as seen in FIG. 2B. Then, during the springback phase, the binder force is removed and the upper tool is withdrawn, and springback deformation causes the part to lift away from the lower tool, as seen in FIG. 2C. The challenge for die compensation is then to predict modifications to the shape of the tool so that the part takes the shape of the original tool after springback. Generally the lower tool is of more importance in determining the final shape of the part after springback. However, both the lower and upper tool may be designed to minimize springback with the present invention.

Figure 3A:
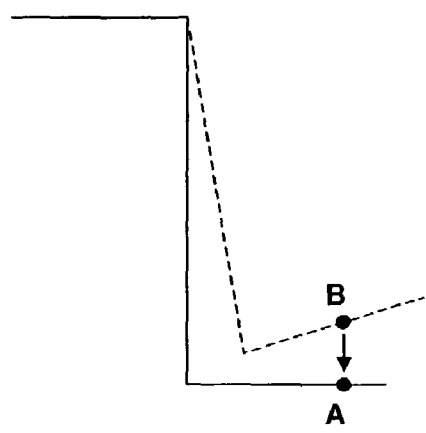
FIGS. 3A and 3B are a comparative illustration of the correspondence between the tool and part, in the prior art and the new method of the present invention.
Figure 3B:
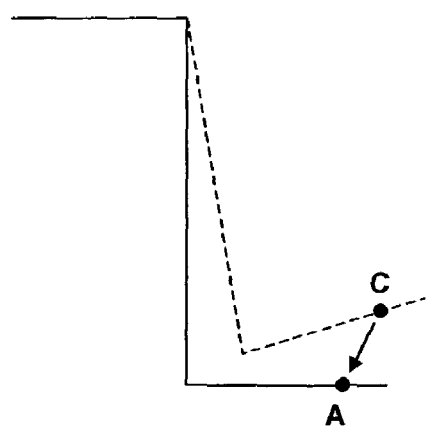

In the discussion to follow, this simple example is illustrated using only the outline of the lower tool and the stamped part. In reality, the upper and lower tool and the resultant stamped part are significantly more complex. Typical stamped parts include complex curves and volumes as seen in FIG. 21. FIG. 3 compares the new proposed strategy (FIG. 3B) to a prior art die compensation strategy (FIG. 3A) which is frequently used in the trial-and-error method. Cross-section views show the lower tool (solid line) and the part after springback (dashed line). The upper tool, which has the same profile as the lower tool, is not shown.

To compute die compensation, corresponding locations between points on the tool and points on the part must be identified. In the trial-and-error method, correspondence is determined by vertical projection. The trial and error method of FIG. 3 shows that location A on the tool is projected vertically to location B on the finished part. This incorrectly identifies a correspondence between points A and B. In the new proposed method, FIG. 3 shows that point A on the tool corresponds to point C on the part, since these two locations were coincident at the end of the stamping operation, before springback.

The points A and C in FIG. 3 were coincident before springback because the part was clamped between the closed upper and lower tools. However, the FEA meshes used to describe the tools and the part may be (and usually are) different. For this reason, a projection technique is applied in the proposed method from point A on the tool, in the direction normal to the part, to find location C on the part. The projection is applied before springback, since at that time the part and tool are very close together. Location C is generally not coincident with a node point in the FEA mesh of the part, but rather lies somewhere inside a mesh element. Bi-linear interpolation is used to compute the springback deviation at location C from the values at the nodes (corners) of this element.

Once the springback deviation is known at each point on the tool surface, the compensated tool geometry can be created by simply offsetting each tool point (in the normal direction) by a distance equal to the springback deviation. FIG. 4 shows the compensation as computed in the trial-and-error prior art and new proposed methods.

Scale Factor

The springback deviation is computed by comparing the intended part and the new part after springback. It has been found that if the die is modified to fully compensate this deviation, it is possible to over-compensate for the springback effect, and the next part will show deviation in the opposite direction. An effective way to correct for this tendency is to apply a scale factor to the springback deviation. Typical scale factors range from 0.5 to 0.9, producing compensations of 50% and 90% of the corresponding springback deviations, respectively. This factor is applied to the offset A-A" in FIG. 4. Since the optimum value of this scale factor has been found to be case dependent, the scale factor is an input variable in the present invention.

Extrapolating Deviation Data

Springback deviation data is needed for every point on the tool surface in order to compute compensation. A projection technique can be applied where the part and tool overlap after forming. Extrapolation must be used at locations on the tool which lie outside the part boundary. To extrapolate, a surface tangent to the part geometry is calculated along the part boundary, and then deviation data from the part boundary is extended along this surface to the outer boundary of the tools. Projection can then be used to transfer data to and from this extended surface.

Iterative Die Compensation Method

If the compensated tools do not produce a satisfactory part, the proposed algorithm can be re-applied a number of times in an iterative approach. In this way, the springback compensation can be improved until a quality criterion is reached. In addition, the iterative procedure reduces the method's sensitivity to the aforementioned scale factor.

Overview of the Iterative Method

Some additional bookkeeping is necessary to compute the springback deviation in the iterative method. For this purpose, a database is prepared containing two reference geometries. The first reference geometry represents the intended or desired part surface, and the second reference geometry represents the accumulated modifications of the original reference surface during all previous iterations. (Notice that these geometries are equivalent at the start of the first iteration, so the database is unnecessary unless an iterative method is selected.) These reference geometries are stored in the form of the FEA mesh of the original part, differing only in the coordinates of the FE nodes.

After each iteration of the compensation method, the second reference geometry is updated to represent the new tool geometry. The database thereby serves as a bridge to map results between the intended part and the modified tool geometry. The second reference geometry is used to compare the new part to the intended geometry, thus obtaining the new springback deviation.

FIG. 5 illustrates the new proposed iterative compensation procedure. Results from the first iteration are shown in box 505A. These are used to define the first and second reference geometries, RG1 and RG2, respectively, shown in box 505B. The second springback simulation is shown in box 505C, where the dashed line represents the final part produced by the compensated die RG2. Compensation for tool RG2 at point A is computed from the corresponding part location C, and the corresponding location in the first reference geometry RG1 location D. The second compensated tool is shown in box 505C, where springback deviation CD is applied at location A to compute location A''' on the second compensated tool.

Box 505A of FIG. 5 shows the finished part and compensated tool as produced by the single step method. These results are used in box 505B to define the reference geometries RG1 and RG2, where RG1 corresponds to the desired part, and RG2 corresponds to the compensated surface. In box 505C, the correspondence is shown between location A on the compensated tool, and location C on the deformed part. These two locations were coincident after the second part was stamped, before springback. Location D is the position on the reference geometry RG1 corresponding to location A in RG2. Location D is determined easily because RG1 and RG2 use the same FE mesh, giving a one-to-one correspondence in their FE node numbers. Box 505D shows how the springback deviation (segment CD) is applied to the compensated tool at location A to produce a new compensated tool geometry at A'''.

Details of the Iterative Method

The iterative algorithm illustrated in FIG. 5 represents the actual algorithm used in the preferred embodiment, but for simplicity several underlying projection operations have been omitted. The complete algorithm description of the preferred embodiment is presented in the flow charts of FIGS. 7-9. Details are described below.

Reference Geometry Database

The reference geometries RG1 and RG2 are saved in the form of FE meshes. These meshes are copied from the mesh of the part after the first stamping operation, before springback. The mesh structure—number and arrangement of nodes and elements, generally will not match the meshes used for the tools. During the stamping process, the part mesh is typically adaptively refined, so the mesh structures of RG1 and RG2 may also not match those of the part in later iterations of the compensation procedure.

Tool Meshes Are Treated Similarly

Symbol T1 is used to represent FE meshes of the stamping tools. These generally include an upper and lower die, and one or more blankholding and pad tools. Since each of these tools is individually treated using the same procedure in the iterative method, they are collectively referenced by a single symbol in the algorithmic descriptions. However, it should be understood that operations on T1 are applied to all tools individually.

Mapping Data Between Meshes

Data are exchanged, or mapped, between meshes during the computation of springback deviation at corresponding locations in the part, tool, and reference geometries. If the meshes are identical, then corresponding locations can simply be identified by the common node ID, or the position within the common mesh element. This is the case with the reference geometries RG1 and RG2.

In cases where meshes differ, a projection technique is used to identify corresponding locations. Our method employs projections only in cases where the mesh geometries are very nearly coincident, at the end of the stamping operation, before springback. In these cases, the location in mesh A corresponding to a point in mesh B can be uniquely determined by closest point projection.

Figure 6:
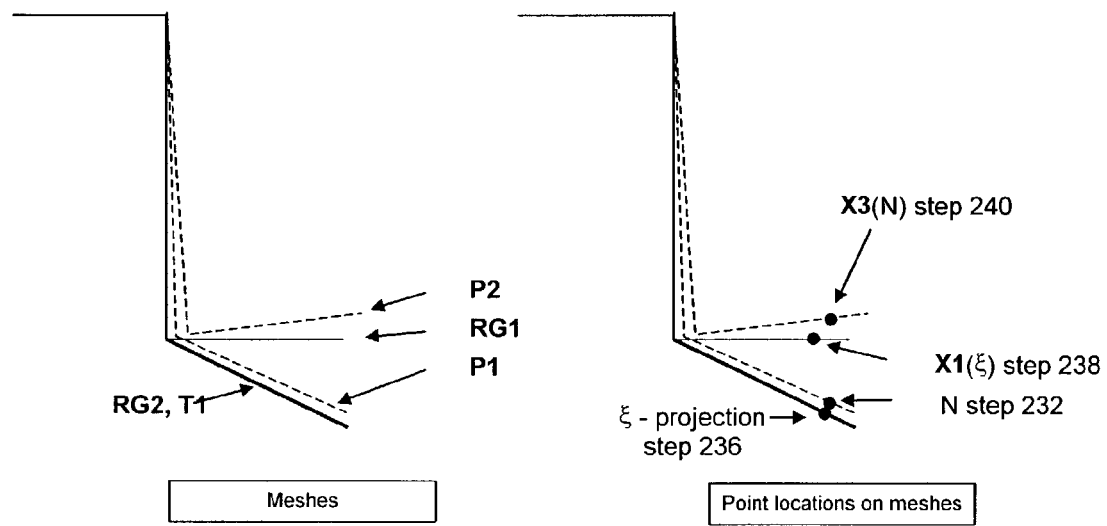
FIG. 6 is an cross section of finite element meshes of the tool and part before and after stamping.
Figure 7:
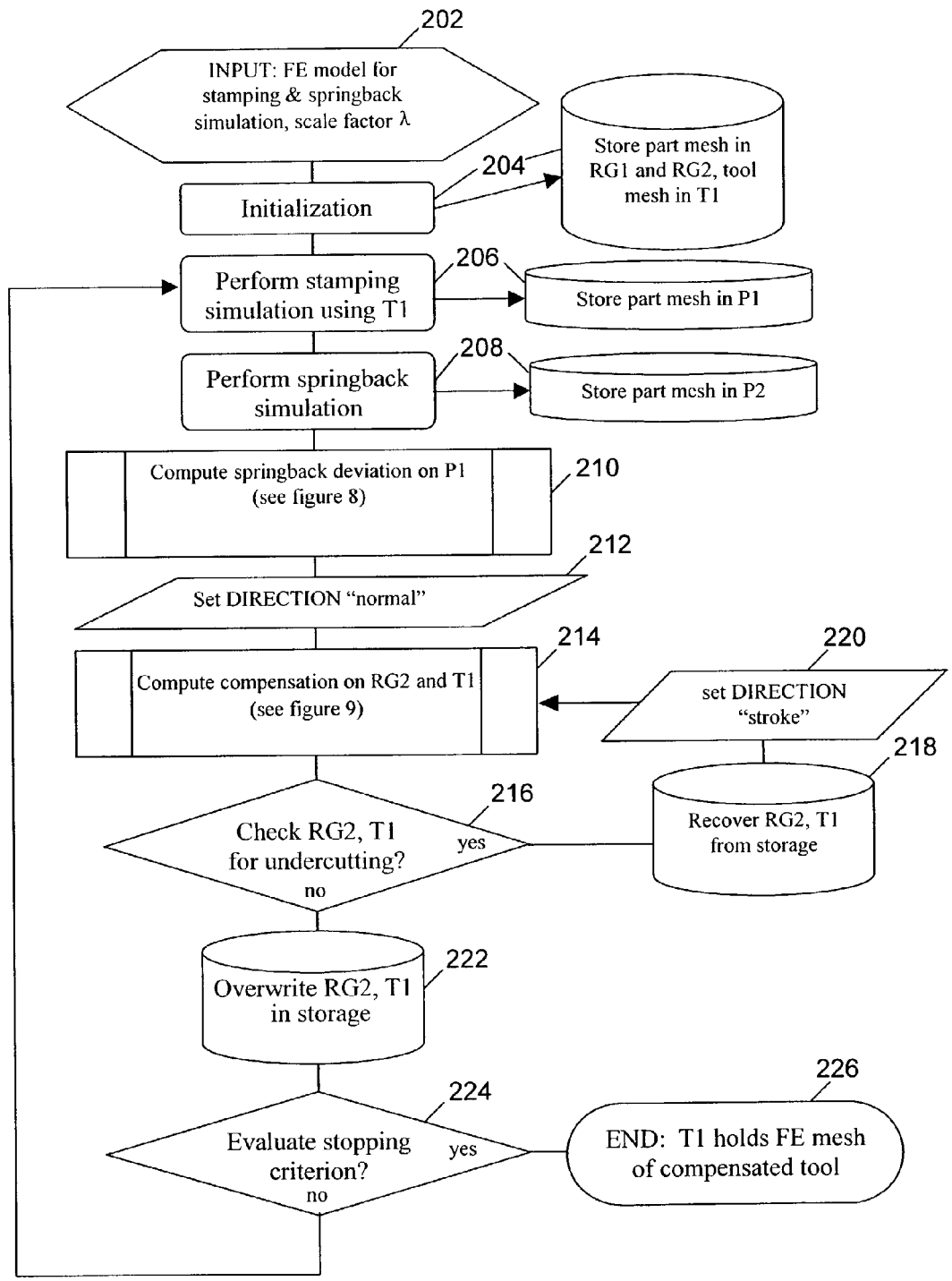
FIG. 7 is a flow chart of the iterative die compensation method.
Figure 8:
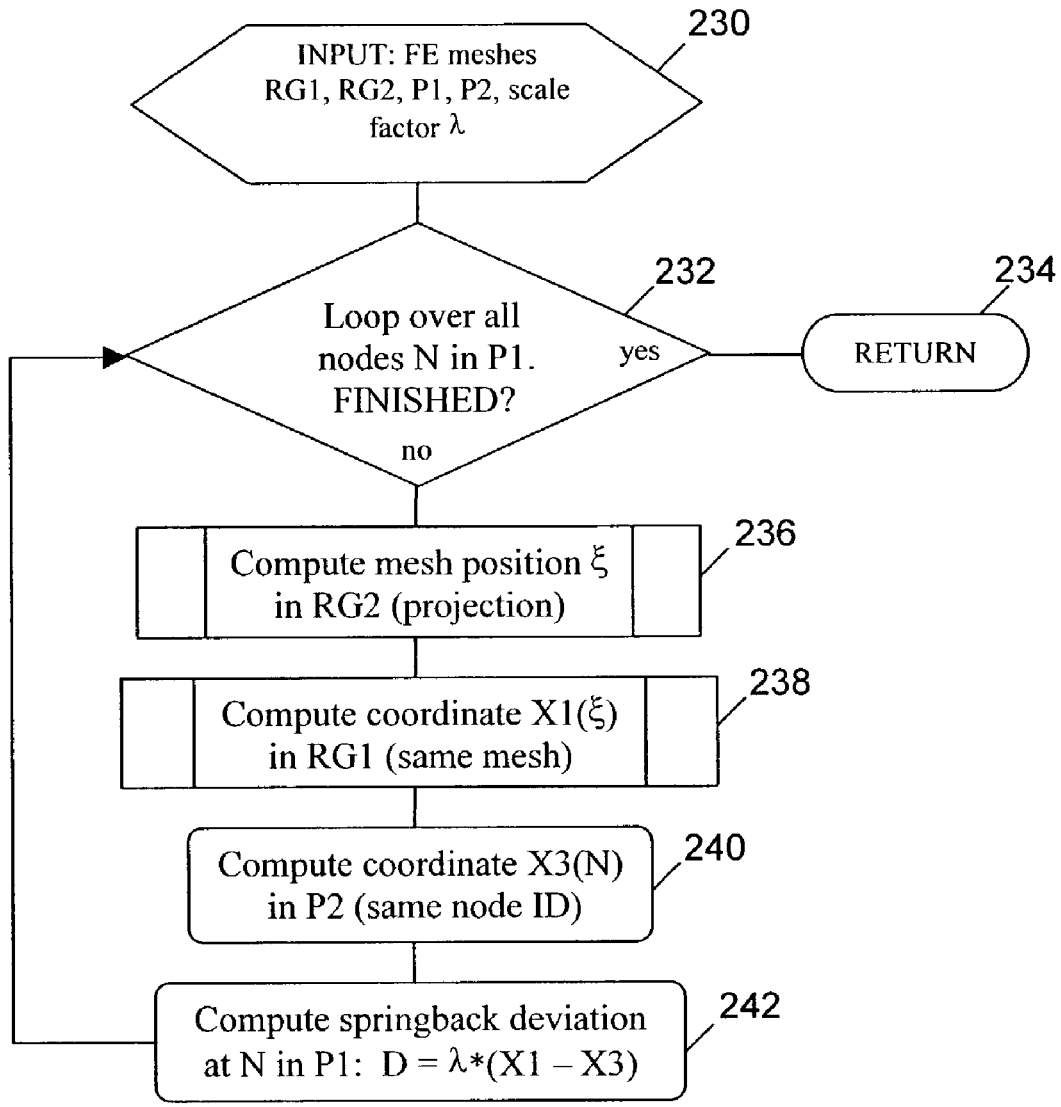
FIG. 8 is a flow chart describing calculation of springback deviation.

In FIG. 6 the FE meshes presented in the flow charts of FIGS. 7-9 are represented for the simple example described previously. RG1 and RG2 represent FE meshes of part in the first and second reference geometry. RG1 represents the ideal shape of the part. P1 represents the current FE mesh of the part after stamping. P2 represents the current FE mesh of the part after springback. T1 represents the FE mesh of the tool. This may be either the upper and lower tool, as discussed earlier, but for simplicity during discussion, T1 will generally be referred to as the lower tool. T1 and RG2 overlay each other in space, but may have different mesh resolution. P1 lies between the (upper and lower) tools T1, but for simplicity is drawn with a small offset. The upper tool is not shown, but is compensated in the same manner as lower tool. The goal is to design a tool, T1, that produces the ideal shape RG1.

FIG. 6 illustrates the various mesh geometries used at an intermediate iteration of the method. Notice that RG2, T1, and P1 are nearly coincident meshes of the tools, part, and reference geometry after stamping, so the projection technique can be used in mapping data between them. Meshes P2 and RG1 lie far away from the other meshes, so their data can be accessed only by corresponding node and/or element IDs. This implies that data in mesh P2 can only be exchanged with mesh P1, and data in mesh RG1 can only be exchanged with RG2, since these are meshes with equivalent structure. This is because mesh P1 and P2 have the same nodes and elements, as do meshes RG1 and RG2. Thus, a position on P1 can be directly located on P2 by simply going to the same node number or element. Likewise, a position on RG1 can be directly located on RG2 by going to the same node number or element. However, to find the position on P1 that corresponds with the position on RG2, it is necessary to make a projection. Projection of nodes is discussed in detail in U.S. patent application Ser. No. 10/081,387 to Olovson, entitled "Eularian Lagrangian Mapping for Finite Element Analyses," which was previously incorporated by reference. With this understanding, it becomes clear why RG1 and RG2 are needed, and how they are used.

Initialization of Normal Vectors

During the initialization process, the outward normal vector is computed for each mesh element. The right-hand-rule is used, proceeding from the first to the last element node. A check is made to ensure that the vector dot product of each element normal vector with the stroke direction is greater than or equal to zero. The node numbering of mesh elements with negative dot products is reversed. This initialization is necessary to avoid sign errors when compensation and undercutting calculations are performed later in the compensation procedure.

Avoiding Undercutting

Mesh compensation is initially applied in the direction of the element normal vectors. Each mesh is then tested for potential undercutting. These tests are performed by computing the vector dot product of each new element normal vector with the stroke direction. If any of these dot products evaluates to a negative sign, undercutting is present in the compensated FE mesh. In this case, the most recently applied compensation is discarded, and new compensation is computed in which the meshes are modified only in the stroke direction. This procedure is represented using the variable DIRECTION in the flow chart of FIG. 7.

FIG. 7 is a flow chart describing the iterative die compensation method. RG1 and RG2 represent FE meshes of the part in the first and second reference geometries, respectively. P1 and P2 represent FE meshes of the part in the current iteration, before and after springback, respectively, and T1 represents FE meshes of the tools.

In step 202 the system inputs the finite element models to be used in the simulation. These models are developed by an engineer or other user of the system. In step 204 the system is initialized and the finite element meshes for the part in the first (RG1) and second (RG2) reference geometries are stored. In step 206 the system performs a stamping simulation using tool T1 and stores the finite element mesh for the resulting stamped part as P1. In step 208 the system performs the springback simulation of part P1, as seen in FIG. 6, and saves the finite element mesh of the sprungback part as P2. Then, in step 210, the springback deviation is computed on P1. Step 210 is expanded in the flowchart of FIG. 8, and will be discussed in further detail later. In step 212, the variable DIRECTION is set to "normal." As discussed above, this is because mesh compensation is initially applied in the direction of the element normal vectors, i.e. perpendicular to the working surface of the tool. In step 214, compensation on RG2 and T1 is calculated according the flowchart of FIG. 9, which will be discussed in further detail later. In step 216, RG2 and T1 are checked for any undercutting, the phenomenon illustrated in FIG. 1B. If undercutting is found, the previous iteration of RG2 and T1 will be recovered from storage in step 218. The DIRECTION of the tool will then be set in the stroke direction in step 220 rather than in the normal direction that it was set to in step 212. New compensations of RG2 and T1 will again be calculated in step 214. If no undercutting is found in step 216, RG2 and T1 will be overwritten in step 222 without performing steps 218 and 220. If the stopping criterion are met in step 224, the iterative process will be complete and T1 will be the desired finite element mesh of the compensated tool, as seen in step 226. The stopping criterion may comprise a number of iterations, a maximum deviation from an ideal part, measured at one or several locations, or other criteria set by the user. If the criterion are not met in step 224, another stamping simulation starting at step 206 will be undertaken.

FIG. 8 is a flow chart describing calculation of springback deviation D on P1, for the iterative die compensation method, step 210 of FIG. 7. Finite element meshes RG1, RG2, P1, P2, and scale factor $\lambda$ are input in step 230. These meshes and the point locations thereon may be seen in FIG. 6. Generally, the springback deviation D is calculated for all nodes. In step 232 the system checks whether deviation D has been calculated for all nodes. If so, the process continues on with step 212 of FIG. 7, as seen in step 234. If not, the mesh position $\xi$ in RG2 is calculated in step 236. $\xi$ is the coordinate position within a specific element on the mesh. This is done by projecting the position from P1 to RG2. In step 238 a coordinate $X1(\xi)$ on RG1 corresponding to the coordinate on RG2 is determined. Because RG1 and RG2 have the same mesh (in different geometries) the location of coordinate $X1(\xi)$ is easily found by referring to the node and element numbers of the meshes.

A coordinate location X3(N) in P2 (part mesh after springback) is then calculated in step 240. This location has the same node ID number as the corresponding position on P1 (part mesh before springback). Thus, the deviation of a point N after springback is compared to its position in the desired or ideal geometry RG1. This is done in step 242 by multiplying the scale factor λ by (X1-X3).

FIG. 9 is a flow chart describing the reference geometry and tool updates in the iterative die compensation method. FIG. 9 further describes step 214 of FIG. 7. P1 represents the FE mesh of the part after stamping, and Q1 is a variable representing either the FE mesh of the second reference geometry RG2 or the tools T1. The variable DIRECTION is selected to eliminate undercutting, if detected.

In step 250 the finite element meshes P1, Q1 and the variable DIRECTION are input from the storage medium. In step 252 the system checks to see if all nodes K in Q1 (the mesh of RG2 or T1) have been compensated. If so, the system proceeds to step 216 of FIG. 7, as seen in step 254. If not the system proceeds to step 256 and computes the mesh position $\xi$ in P1. The position is projected from Q1 (either RG2 or T1) to P1, according to the well known closest-point method. This is done when the two meshes are most nearly contiguous, which is before springback at the time of the simulated stamping when the part and tool are in contact. This projection method is described in many places, in particular in the following technical journal article: J. O. Hallquist, G. L. Goudreau, and D. J. Benson, "Sliding interfaces with Contact-Impact in Large Scale Lagrangian Computations", Computer Methods in Applied Mechanics and Engineering, Vol 51, pp. 107-137, 1985, which is hereby incorporated by this reference in its entirety.

In step 258 the deviation D of the mesh position $\xi$ of P1 from Q1 is determined. The mesh position $\xi$ is the position within a particular finite element. The deviation at position $\xi$ is computed by simple bilinear interpolation of the deviation at the nodes that form the element containing position $\xi$. In step 260 the variable DIRECTION is checked. If the variable is set to the normal direction the unit vector V is set normal to Q1 at node K in step 262. If the unit vector V is set in the stroke direction, the unit vector V is set in the stroke direction in step 264. Finally, in step 266, Q1 (either RG2 or T1) at node K is calculated and updated such that x(K)=x(K)+(D·V) V. If this has been calculated for all the nodes then the system will proceed to step 216 of FIG. 7 as seen in steps 252 and 254.

Example Applications of the New Method

Several simulations have been performed to demonstrate the application and effectiveness of the new die compensation method. Results are shown in the following sections for four examples.

Numisheet U-Channel

FIG. 10 is a finite element model of the NUMISHEET '93 U-Channel benchmark problem, shown at various stages during the stamping simulation. The tools close to form a strip of metal into a hat-shaped section consisting of all 90-degree radii.

The NUMISHEET '93 U-Channel part is a well known benchmark problem in springback, first presented at the NUMISHEET conference in 1993. The simple geometry and large springback deformation make an interesting example. The springback behavior of each flange of the symmetric part is similar to that shown in the illustrations of FIGS. 3-6.

A model used to illustrate usage of the preferred embodiment is the U-Channel shown in FIG. 10. The U-Channel part is shown at various stages of production in stages A-D. The tools consist of a lower punch 502, lower blankholders 504, combined upper die/blankholders 506, and the sheet metal blank, 508a to be formed. The overall height of the finished part is approximately 80 millimeters, and the blank thickness is approximately one millimeter. During the process, the flat blank 508a is placed between the blankholders, and the upper tools 506 are advanced downward, as seen in stages B-D. Friction against the blankholders restrains the blank as it draws over the radii of the upper tool, forming the part.

At the end of the stamping simulation, seen in stage D, the part is in contact with the tools at nearly every location, and has been formed with four corners of exactly 90 degrees each. As the tools 502, 504, and 506 are retracted, internal stresses within the part formed from blank 508 relieve, and springback deformation causes the part to lift away from the tools. FIG. 11 shows this springback deformation using uncompensated tools, with the upper tools 506 removed, and superimposed images of the part 508b before springback and the part 508c after springback. The springback deformation creates an angle in the outer flanges of the part of approximately 30 degrees from horizontal, which would ideally remain flat and parallel. Springback deviation is largest at the tips of the flanges. The objective of die compensation is to eliminate this angle, so that the flanges of the finished part could be easily welded to a flat plate.

The new single-step die compensation method was utilized in the simulation shown in FIG. 10. A scale factor of λ=1.0 was selected, so the flange angle in the compensated tools produced by the method is approximately −30 degrees (FIG. 12). Notice that this increase in flange angle mandates modifications to the starting position and total stroke distance of the moving tools. FIG. 12 also shows the FE model at the end of the stamping simulation, with the sheet blank formed to the shape of the new tools.

In FIG. 12, finite element models of the compensated tools, produced by applying the new method, are shown before stamping (left) and after stamping (right). Compensation was computed using the new single-step method with a scale factor λ=1.0. Springback deviation data used in the compensation was taken from the simulation shown in FIGS. 10 and 11. Note that upper tool 506 has a flange angled downward so that the part made from the blank 508 will be angled before springback, and flat after springback.

Figure 13A:
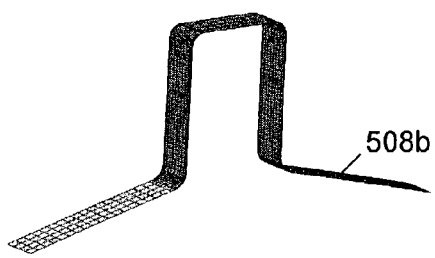
FIGS. 13A-C illustrate the NUMISHEET '93 U-channel after stamping using the compensated tools designed with the present invention.
Figure 13B:
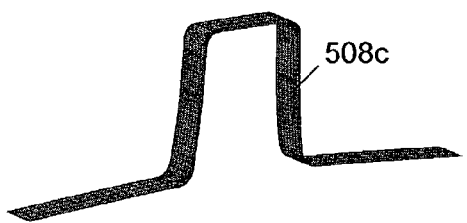
Figure 13C:
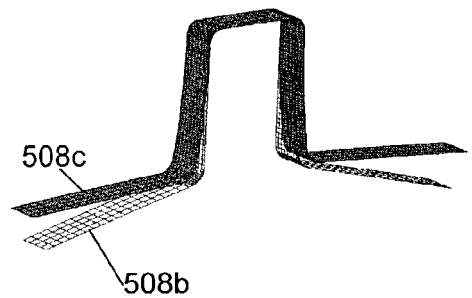

The springback of this part is shown in FIGS. 13A-13C. The compensation tools produced a part with negative flange angles before springback, but nearly zero flange angles after springback. Elevation (Z-direction) coordinates for several locations along one flange are shown in FIG. 14 before and after springback, for the original and modified tools. The compensated tools produced flanges which were flat within a maximum deviation of six millimeters, or eight percent of the overall part height.

FIGS. 13A-13C illustrate springback of the U-Channel benchmark part after stamping using the compensated tools. FIG. 13A shows the part after stamping (508b) but before springback, and FIG. 13B shows the part after springback (508c). FIG. 13C superimposes the part before (508b) and after springback (508c), demonstrating that the compensated dies produce a part with nearly flat, parallel flanges after springback.

Several further simulations were performed on the U-Channel part. Tools compensated with a scale factor of λ=0.50 produced excellent results, showing a maximum deviation of 0.74 millimeters in the flange area. A second compensation iteration was applied to the tool design obtained with λ=1.0, this time using a scale factor of λ=0.75. These tools produced the best overall part, with maximum deviation of 0.65 millimeters in the flange area. This demonstrates the effectiveness of the iterative method in improving results obtained with a relatively poor choice of scale factor. FIG. 14 presents a chart summarizing all of the U-Channel results.

In FIG. 14, deviations from the desired part shape, in millimeters, are shown at four equally spaced points along the flange of the U-Channel part. Point A is nearest the center, and point D is at the outer tip of the flange. Deviation data values are indicated for point D since this is the location of largest deviation. Results are shown for four tools: the original tools, Tool 1, obtained using a single step compensation with scale factor $\lambda=0.5$; Tool 2a, obtained using a single step and $\lambda=1.0$; and Tool 2b, obtained by applying a second compensation iteration to Tool 2a with a scale factor of $\lambda=0.75$. The best single step result was obtained with $\lambda=0.5$. The second iteration substantially improved the single step $\lambda=1.0$ result, producing the best finished part overall.

Numisheet S-Rail

The NUMISHEET '96 S-Rail part is another well known benchmark problem in springback, first presented at the NUMISHEET conference in 1996. The tools and procedure used to stamp this part (FIG. 15) are similar to those used on the U-Channel part, but include the additional complexity of an S-shaped profile in the third dimension.

In FIG. 15, a finite element mesh for the NUMISHEET '96 S-rail part is shown with the upper tool removed for clarity. Finished part dimensions are approximately 250 mm length× 100 mm width×40 mm depth×1.0 mm thickness. On the left, you can see the blank 550a before stamping. On the right, you can see the part 550b after stamping.

The springback behavior of the S-rail is similar to the U-channel part: as the tools are withdrawn, the channel opens and the flanges displace away from the tools. A simple measure of springback deformation is the flange angle, which indicates the flatness of the flanges relative to each other. The flanges of an ideally compensated part will sit flat on a flat surface (zero flange angle).

Several simulations were performed on the S-rail part to investigate the effect of compensation scale factor $\lambda$. Results are shown in FIG. 16, presented in the form of flange angles measured after springback. Results show a steady improvement in flange angle as the compensation scale factor is increased, with the best result (smallest flange angle) for the case $\lambda=1.0$. This result is in contrast to the U-Channel (FIGS. 10-14) results, where a scale factor of $\lambda=0.5$ produced much better compensation than $\lambda=1.0$. This observation shows that the choice of optimum scale factor is case dependent, making the iterative method attractive due to its ability to correct for poorly chosen scale factors.

In FIG. 16, deviations in flange angle from the desired part shape, in degrees, are shown as measured at the end section of the S-rail for various values of compensation scale factor $\lambda$. The deviation improves continuously as $\lambda$ ☐ is increased, with $\lambda=1.0$ giving the best overall part.

Budd Complex Channel

The Budd Complex Channel is a springback benchmark developed to represent springback behavior typically found in larger automotive panels. The "crash form" stamping process is used for the Budd Channel, in which a sheet metal blank is stamped between an upper die and lower punch tools, but a blankholder is not used to restrain the sheet. The FE model of the Budd Channel stamping operation is shown in FIG. 17, at the beginning, middle, and end of the operation.

Figure 18:
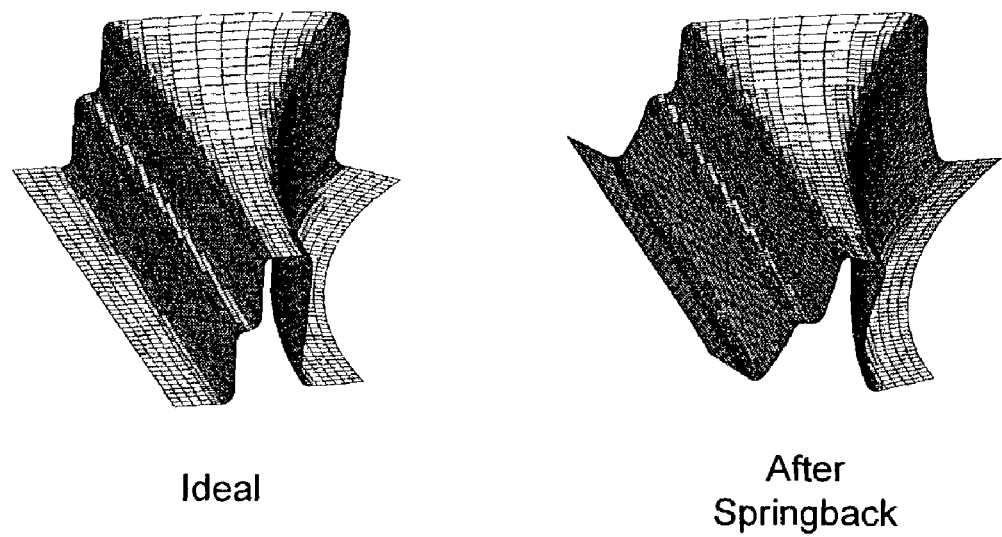
FIG. 18 illustrates the finite element model of the Budd Channel part of FIG. 17 in the ideal form at stamping on the left and after springback on the right using uncompensated tools.

Springback deformation in the Budd Channel occurs primarily in the flange areas, with secondary effects of sidewall curling and twisting of the channel. The deformed FE model after stamping, and after springback, is shown in FIG. 18 for parts produced by the original dies. The desired part shape is the shape of FIG. 18 after stamping, with flat flanges.

Figure 19:
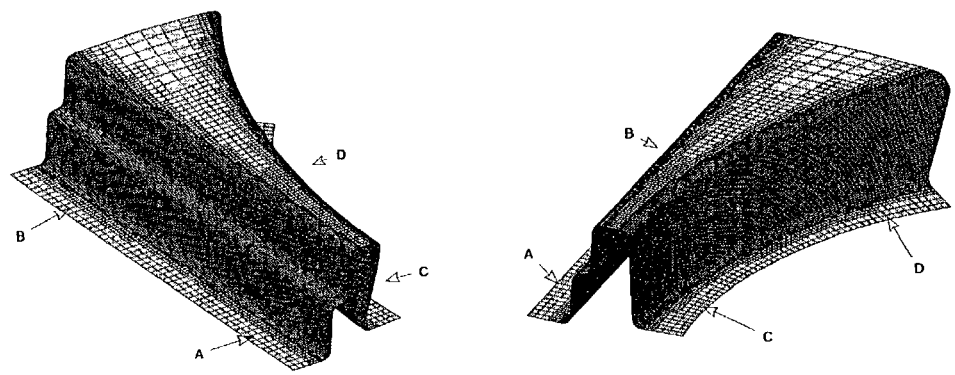
FIG. 19 illustrates the locations where springback is measured for the example of the Budd Channel part.

Springback deviations were measured at four locations on the Budd Channel flanges, as shown in FIG. 19. Springback compensation results are shown in FIG. 20. This figure presents deviations at each measurement location, for the original tools and for three compensated tools. The best compensation strategy (producing the smallest deviations) is the iterative strategy. These results parallel trends seen in compensation of the U-Channel part.

In FIG. 17 the finite element model for the Budd Channel example is shown at the beginning, middle, and end of the stamping simulation. Adaptive mesh refinement during the stamping simulation automatically subdivides elements as they approach the tools, resulting in a final mesh with very small elements.

In FIG. 18 the Budd Channel part is shown immediately after stamping, in its ideal form before springback with the original tools on the left, and after springback on the right. Springback deformation induces flange angles, sidewall curling, and twisting of the part.

FIG. 19 is a chart of springback deviations that were measured at flange locations A, B, C, and D as indicated on the Budd Channel part.

FIG. 20 is a chart in which the deviations from the desired part shape, in millimeters, are shown at the four points A, B, C, and D (FIG. 19) on the flanges of the Budd Channel part. Results are shown for four tools: the original tools; Tool 1, obtained using a single step compensation with scale factor $\lambda=0.75$; Tool 2a, obtained using a single step and $\lambda=1.0$; and Tool 2b, obtained by applying a second compensation iteration to Tool 2a with a scale factor of $\lambda=1.0$. The best single step result was obtained with $\lambda=0.75$. The second iteration substantially improved the single step $\lambda=1.0$ result, producing the best finished part overall.

Hood Inner Panel

Figure 21A:
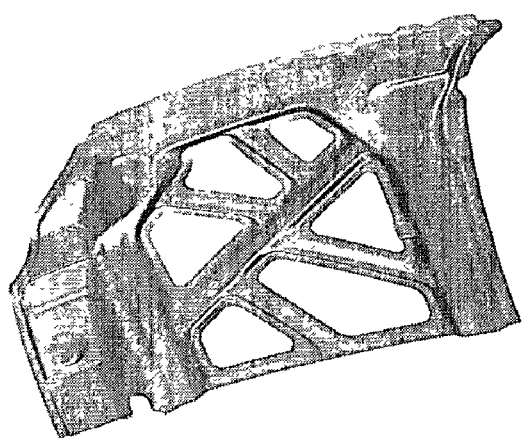
FIG. 21A illustrates the part surface contours of an automotive hood shown after stamping used to illustrate the present invention showing the points where springback deviations are monitored.
Figure 21B:
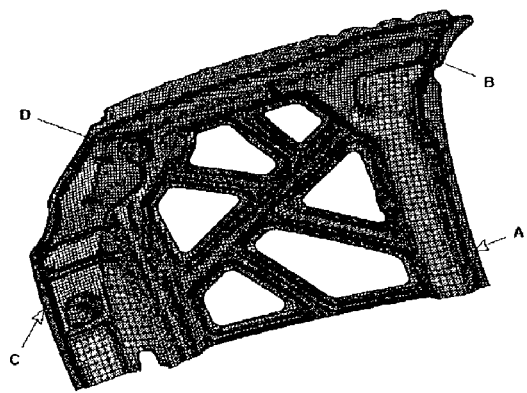
FIG. 21B is a finite element mesh of the automotive hood shown in FIG. 21A.

The hood inner panel is a production sized automotive part. The finite element model shown in FIGS. 21A and 21B represents one half of the symmetric part. The stamping process used to produce this part is typical for production processes: binder closure followed by closing of the primary dies. Drawbeads located around the perimeter of the binder opening constrain material from flowing into the die cavity. After forming, material is trimmed away in several locations to provide access holes, to lighten the part, and to shape the part's outer profile. After trimming, the springback simulation is performed. In this way, the effect of removing material by trimming is included in the springback prediction.

In FIGS. 21A and 21B, the automotive hood inner panel is shown after forming. FIG. 21A shows the part surface contours, while FIG. 21B shows the FE mesh used to represent the part. Dark areas of the FE mesh are highly refined to accurately represent small features of the part. Labels A, B, C, and D indicate locations where springback deviations were monitored.

Overall springback deformation was relatively small on the hood inner panel compared to the other examples. FIG. 22 is a graph, illustrating springback deviations at each of the four measurement points, for parts produced by the original tools and by two compensated tools. The worst springback deviation using the original tools was 5.1 millimeters at location A in the windscreen area of the panel. Deviations at the other three locations were less than one millimeter.

In the chart of FIG. 22, deviations from the desired part shape, in millimeters, are shown at four points on the hood inner part. Point locations are shown in FIG. 21B. Results are shown for three tools: the original tools; Tool 1a, obtained using a single step compensation with scale factor λ=0.75; and Tool 1b, obtained by applying a second compensation iteration to Tool 1a with a scale factor of λ=1.0.

Tool 1a was created by applying a single step compensation with scale factor λ=0.75. FIG. 22 shows that tool 1a effectively reduced the worst springback deviation at location A to 0.1 millimeters, while deviations at locations B, C, and D remained below one millimeter. A second iteration was applied to create Tool 1b using a scale factor λ=1.0. Deviations produced using this tool remained below one millimeter at every location, although deviation at location A actually increased to 0.7 millimeters. This illustrates that, for production panels, once deviations have been reduced to sub-millimeter levels, further compensation may not produce further improvements.

From the example results it is seen that the current method can provide an effective system and method for springback compensation. The method has several advantages which include: (a) avoidance of the undercut problem; (b) use of a scale factor to provide efficient compensation; (c) efficient tool compensation requiring relatively few simulations; and (d) little or no dependence on user experience.

The system and method of the present invention can be expected to produce compensated tools which reduce springback deviations to less than one millimeter in production applications such as automotive applications.

The invention claimed is:

1. A computer implemented method of designing a tool used to form a part, the method comprising:
    receiving final desired dimensions of the part;
    simulating the tool used to form the part with a finite element model of the tool;
    simulating the part, the simulation including residual internal forces at an intermediate stage of the formation of the part;
    identifying one or more mesh node locations on the simulated part that correspond to one or more mesh node locations on the simulated tool respectively, and thereafter
    modifying the finite element model of the tool to account for the residual internal forces at the intermediate stage of the part such that the residual internal forces deform the part to the final desired dimensions, thereby compensating for springback deviation resulting from any of the residual internal forces; wherein the compensation is initially applied in a normal direction to each element of one or more of the finite element models, and wherein the compensation is subsequently applied only in a stroke direction if the initial compensation is unsatisfactory.

2. The method of claim 1 wherein modifying the tool comprises projecting the one or more mesh node locations from the mesh of the simulated part to the mesh of the simulated tool.

3. The method of claim 1 wherein a scale factor is applied when modifying the tool.

4. The method of claim 1 wherein there are two or more iterations of the formation of the part.

5. The method of claim 1 wherein the method of designing the tool further comprises automatically detecting undercutting as part of the computer simulation of the tool and the part, and eliminating any detected undercutting from the tool.

6. The method of claim 1, further comprising computing a vector dot product of an element normal vector of each element with the stroke direction.

7. The method of claim 6, wherein the initial compensation is deemed unsatisfactory if any of the vector dot products evaluates to a negative sign, and wherein the initial compensation is discarded if deemed unsatisfactory.

8. A computer implemented method of designing a tool used to form a part, the method comprising:
    (a) receiving, from a user, dimensions of the part after any potential springback;
    (b) creating a finite element model of the tool;
    (c) creating a finite element model of a part made with the tool and saving the finite element model of the part as a first reference geometry finite element model file;
    (d) simulating the springback that occurs when the part is made with the tool;
    (e) automatically compensating for the springback by directly modifying the finite element model of the tool;
    (f) simulating the part with the compensated tool;
    (g) detecting undercutting as part of the simulation by computing a vector dot product of an element normal vector of each element of the finite element model of the tool and/or part with the stroke direction of the finite element mode of the took; and
    (h) saving the finite element model of the compensated part as a second reference geometry finite element model file.

9. The method of claim 8, further comprising:
    (i) repeating steps (e)-(h) one or more times in order to refine the compensation and
minimize or eliminate the springback deviation of the part, and for each repetition updating the second reference geometry finite element model file to reflect accumulated modifications resulting from each repetition performed.

* * * * *